(12) United States Patent
Manabe et al.

(10) Patent No.: US 9,628,727 B2
(45) Date of Patent: Apr. 18, 2017

(54) INFORMATION PROCESSING APPARATUS AND METHOD, AND IMAGE CAPTURING SYSTEM DETERMINING OR ACQUIRING TARGET NOISE AMOUNT

(71) Applicant: CANON KABUSHIKI KAISHA, Tokyo (JP)

(72) Inventors: Yoshihiro Manabe, Yokohama (JP); Takenori Ohno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 14/501,525

(22) Filed: Sep. 30, 2014

(65) Prior Publication Data
US 2015/0097990 A1    Apr. 9, 2015

(30) Foreign Application Priority Data

Oct. 8, 2013 (JP) .................................. 2013-210924
Sep. 17, 2014 (JP) .................................. 2014-189187

(51) Int. Cl.
| | | |
|---|---|---|
| *H04N 5/217* | (2011.01) | |
| *H04N 9/64* | (2006.01) | |
| *H04N 5/357* | (2011.01) | |
| *H04N 5/232* | (2006.01) | |
| *H04N 5/235* | (2006.01) | |

(52) U.S. Cl.
CPC ............. *H04N 5/357* (2013.01); *H04N 5/235* (2013.01); *H04N 5/23245* (2013.01)

(58) Field of Classification Search
CPC ............. H04N 1/2125; H04N 1/00408; H04N 1/00413; H04N 1/00501; H04N 5/357–5/3675; G08B 13/19691

USPC .................................................. 348/241–251
See application file for complete search history.

(56) References Cited

U.S. PATENT DOCUMENTS

| | | |
|---|---|---|
| 5,933,676 A | 8/1999 | Ohno |
| 6,885,395 B1 * | 4/2005 | Rabbani ............... H04N 1/2112 348/231.1 |
| 7,239,347 B2 | 7/2007 | Yamamoto et al. |
| 7,316,026 B2 | 1/2008 | Ohno et al. |
| 7,469,054 B2 | 12/2008 | Aratani et al. |
| 7,518,656 B2 | 4/2009 | Ohno et al. |
| 7,522,195 B2 | 4/2009 | Yamamoto et al. |

(Continued)

FOREIGN PATENT DOCUMENTS

| | | |
|---|---|---|
| EP | 1947840 A1 | 7/2008 |
| JP | 2001-352485 A | 12/2001 |

OTHER PUBLICATIONS

European Search Report issued in counterpart European Patent Application No. 14188107.8-1902, dated Feb. 20, 2015.

*Primary Examiner* — Chia-Wei A Chen
(74) *Attorney, Agent, or Firm* — Fitzpatrick, Cella, Harper & Scinto

(57) ABSTRACT

The present invention provides an image capturing apparatus capable of capturing an image with a desired perceived noise, without requiring time and effort of a user. The present invention is an image capturing apparatus including a target noise amount specifying unit configured to acquire a target noise amount as a noise amount that is targeted, and an image capturing parameter determination unit configured to determine image capturing conditions based on the target noise amount. The image capturing conditions are specified by one or more image capturing parameters.

5 Claims, 41 Drawing Sheets

(56) References Cited

U.S. PATENT DOCUMENTS

| | | |
|---|---|---|
| 7,600,191 B2 | 10/2009 | Yoshikawa et al. |
| 7,848,546 B2 | 12/2010 | Ohno et al. |
| 8,023,032 B2 | 9/2011 | Yoshikawa et al. |
| 8,035,705 B2 | 10/2011 | Tsuruoka |
| 8,082,573 B2 | 12/2011 | Miyamoto et al. |
| 8,462,178 B2 | 6/2013 | Yoshikawa et al. |
| 2003/0122969 A1* | 7/2003 | Higuchi ............... H04N 5/357 348/607 |
| 2006/0262910 A1* | 11/2006 | Molnar ............. G06K 9/00469 379/88.17 |
| 2007/0008099 A1* | 1/2007 | Kimmel ................ A62C 99/00 340/506 |
| 2007/0188634 A1* | 8/2007 | Takei .................... H04N 5/217 348/241 |
| 2007/0242885 A1* | 10/2007 | Yamaguchi ........ G01N 23/2251 382/199 |
| 2008/0204577 A1* | 8/2008 | Tsuruoka ............. G06K 9/4609 348/241 |
| 2008/0252751 A1* | 10/2008 | Kawanami ......... H04N 5/23209 348/231.99 |
| 2009/0040332 A1* | 2/2009 | Yoshino .............. H04N 5/2354 348/222.1 |
| 2009/0059044 A1* | 3/2009 | Tay ..................... H04N 5/3575 348/294 |
| 2009/0167901 A1* | 7/2009 | Aragaki ................ H04N 1/409 348/241 |
| 2009/0265664 A1 | 10/2009 | Shin |
| 2009/0319897 A1* | 12/2009 | Kotler ................... G06T 11/60 715/711 |
| 2010/0079617 A1* | 4/2010 | Kosaka ............. H04N 5/23219 348/229.1 |
| 2010/0134644 A1* | 6/2010 | Kita ...................... H04N 5/232 348/222.1 |
| 2010/0278233 A1* | 11/2010 | Kobayashi ....... H04N 19/00545 375/240.12 |
| 2010/0302447 A1* | 12/2010 | Shirai ...................... H04N 9/73 348/607 |
| 2011/0122266 A1* | 5/2011 | Jang .................. H04N 5/23248 348/208.6 |
| 2011/0216209 A1* | 9/2011 | Fredlund ............ H04N 1/00488 348/211.99 |
| 2012/0008040 A1* | 1/2012 | Miyata ................ H04N 5/2353 348/362 |
| 2012/0044405 A1* | 2/2012 | Kimura .............. H04N 5/23212 348/345 |
| 2012/0206630 A1* | 8/2012 | Nguyen ................ H04N 1/409 348/241 |
| 2012/0327266 A1* | 12/2012 | Prentice ................ H04N 5/238 348/231.99 |
| 2013/0044242 A1* | 2/2013 | Tamura .................. G06T 5/003 348/241 |
| 2013/0088623 A1* | 4/2013 | Ashida ............... H04N 5/35563 348/294 |
| 2014/0176776 A1* | 6/2014 | Morita ................. H04N 5/2621 348/333.11 |
| 2014/0218599 A1* | 8/2014 | Nakamura .......... H04N 5/23241 348/372 |
| 2014/0218600 A1* | 8/2014 | Nakamura .......... H04N 5/23241 348/372 |
| 2014/0240516 A1* | 8/2014 | Kolarov ................. H04N 5/265 348/180 |
| 2015/0029349 A1* | 1/2015 | Ben Israel ......... H04N 5/23277 348/208.4 |
| 2015/0077579 A1* | 3/2015 | Uemura ................ H03F 1/0277 348/208.4 |

* cited by examiner

| | PHOTOMETRIC VALUE XX | | | |
|---|---|---|---|---|
| PHOTOMETRIC VALUE 1 | | | | |
| NOISE AMOUNT | ISO SPEED | SHUTTER SPEED | APERTURE | APERTURE |
| | | | | 1.4 |
| 0.1 | 200 | 1/500 | 1.4 | 2.8 |
| 0.1 | 200 | 1/250 | 2.8 | 5.6 |
| 0.1 | 200 | 1/125 | 5.6 | ... |
| ... | ... | ... | ... | 1.4 |
| 0.2 | 400 | 1/1000 | 1.4 | 2.8 |
| 0.2 | 400 | 1/500 | 2.8 | 5.6 |
| 0.2 | 400 | 1/250 | 5.6 | ... |
| ... | ... | ... | ... | ... |
| ... | ... | ... | ... | ... |
| ... | ... | ... | ... | ... |
| ... | ... | ... | ... | |
| 0.8 | 12800 | | | |

FIG.6

| BRIGHTNESS VALUE | NOISE AMOUNT RANGE |
|---|---|
| 0 | 0.8~1.2 |
| 25 | 0.6~1.0 |
| 50 | 0.4~0.7 |
| 75 | 0.1~0.5 |
| 100 | 0.02~0.15 |

FIG.26

| | TARGET NOISE AMOUNT | | |
|---|---|---|---|
| | 0.1 | 0.2 | 0.3 |
| NOISE AMOUNT 0.1 | | FILTER PROCESSING k = [0.3, 0.4, 0.3] | NOISE ADDITION σ = 0.3 |
| 0.2 | FILTER PROCESSING k = [-0.04, -0.01, 0.11, 0.28, 0.35, 0.28, 0.11, -0.01, -0.04] | | NOISE ADDITION σ = 0.7 |
| 0.3 | FILTER PROCESSING k = [-0.02, 0.02, 0.12, 0.27, 0.35, 0.27, 0.12, -0.02] | FILTER PROCESSING k = [-0.02, 0.02, 0.12, 0.27, 0.35, 0.27, 0.12, -0.02] | |

FIG.32

CAMERA 1

| PHOTOMETRIC VALUE 1 | | | | PHOTOMETRIC VALUE XX ... |
|---|---|---|---|---|
| NOISE AMOUNT | ISO SPEED | SHUTTER SPEED | APERTURE | ... |
| 0.1 | 200 | 1/500 | 1.4 | 4 |
| 0.1 | 200 | 1/250 | 2.8 | 3 |
| ... | ... | ... | ... | ... |
| 0.2 | 400 | 1/1000 | 1.4 | 4 |
| 0.2 | 400 | 1/500 | 2.8 | 3 |
| 0.2 | 800 | 1/2000 | 1.4 | 4 |
| 0.2 | 800 | 1/1000 | 2.8 | 3 |
| ... | ... | ... | ... | |
| ... | ... | ... | ... | |
| 0.8 | 12800 | ... | ... | |

...

CAMERA 5

| PHOTOMETRIC VALUE 1 | | | | PHOTOMETRIC VALUE XX ... |
|---|---|---|---|---|
| NOISE AMOUNT | ISO SPEED | SHUTTER SPEED | APERTURE | ... |
| 0.1 | 100 | 1/1000 | 1.4 | 4 |
| 0.1 | 100 | 1/500 | 2.8 | 3 |
| ... | ... | ... | ... | ... |
| 0.2 | 200 | 1/1000 | 1.4 | 4 |
| 0.2 | 200 | 1/500 | 2.8 | 3 |
| 0.2 | 800 | 1/2000 | 1.4 | 4 |
| 0.2 | 800 | 1/1000 | 2.8 | 3 |
| ... | ... | ... | ... | |
| ... | ... | ... | ... | |
| 0.8 | 12800 | ... | ... | |

FIG.40

INFORMATION PROCESSING APPARATUS AND METHOD, AND IMAGE CAPTURING SYSTEM DETERMINING OR ACQUIRING TARGET NOISE AMOUNT

BACKGROUND OF THE INVENTION

Field of the Invention

The present invention relates to an information processing apparatus, an image capturing system, an information processing method, and a medium. Specifically, the present invention relates to an information processing apparatus capable of adjusting a noise amount of an image, an image capturing system, an information processing method, and a medium.

Description of the Related Art

Conventionally, in the case of image capturing by a digital camera, a user performs image capturing by adjusting capturing parameters, such as the ISO speed, the shutter speed, and the aperture, in accordance with an image capturing scene. As the technique that assists the operation such as this of a user, a technique to automatically set image capturing parameters in accordance with a scene is known. For example, Japanese Patent Laid-Open No. 2001-352485 has disclosed the technique used in an image capturing apparatus having a landscape mode and a portrait mode and which changes the control of the image capturing parameters in accordance with each mode. According to Japanese Patent Laid-Open No. 2001-352485, the number of subjects whose moving speed is high is small at the time of capturing a landscape, and therefore, in the landscape mode, the shutter speed is set slow (e.g., about 1/60 S) and the aperture is set to a small value. Further, in the portrait mode, in order to obtain an image in which a person is in focus and the background is blurred, the aperture is nearly fully opened and the shutter speed is set fast.

SUMMARY OF THE INVENTION

However, the conventional image capturing method has a problem that the amount of noise in a captured image is not uniform because of the change in the state of the subject, even in the case where the image capturing mode of the camera is fixed. Because of this, in order to obtain an image with the same amount of noise, it is necessary for a user to adjust the image capturing condition for each scene, and therefore, time and effort are needed. Consequently, the present invention provides an information processing apparatus (image capturing apparatus) capable of capturing an image with a desired amount of perceived noise without requiring time and effort of a user.

The present invention provides an information processing apparatus including a target noise amount specifying unit configured to acquire a target noise amount as a noise amount that is targeted, and an image capturing parameter determination unit configured to determine image capturing conditions based on the target noise amount. The image capturing conditions are specified by one or more image capturing parameters.

With the present invention, it is possible to easily acquire an image with an amount of noise desired by a user.

Further features of the present invention will become apparent from the following description of exemplary embodiments (with reference to the attached drawings).

BRIEF DESCRIPTION OF THE DRAWINGS

FIG. 6 is a table holding noise amounts and image capturing conditions corresponding to the noise amounts according to the first embodiment;

FIG. 26 is a table showing a relationship between the brightness value and the noise amount range according to the seventh embodiment;

FIG. 32 is an example of an image processing parameter table according to the eighth embodiment;

FIG. 40 is an example of a noise reference table according to the ninth embodiment.

DESCRIPTION OF THE EMBODIMENTS

Hereinafter, embodiments of the present invention are explained with reference to drawings.

First Embodiment

Configuration of Image Capturing Apparatus

Figure 1:
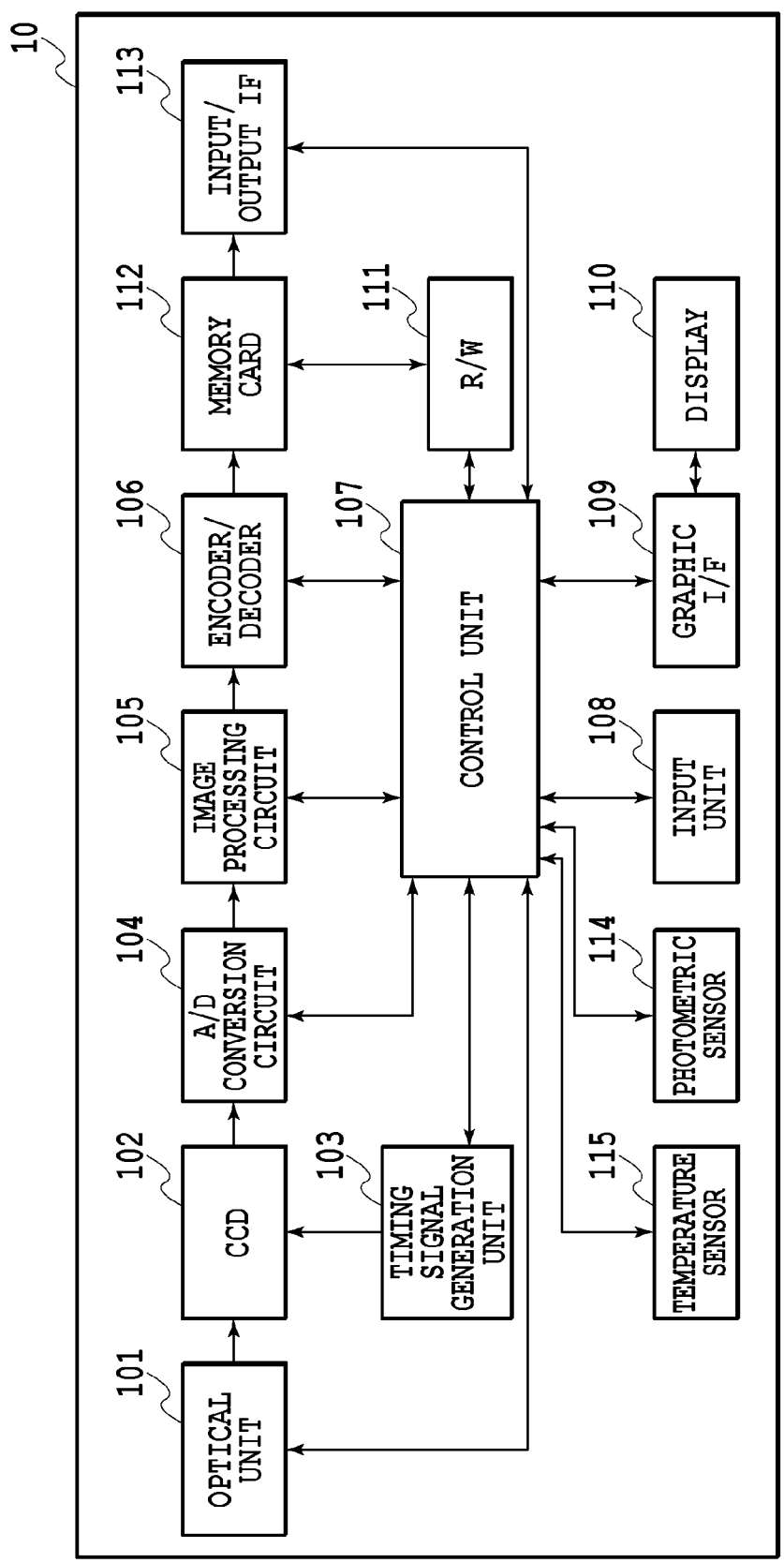
FIG. 1 is a block diagram showing a configuration of an image capturing apparatus according to a first embodiment.

FIG. 1 is a block diagram showing the configuration of an image capturing apparatus 10 according to the first embodiment, such as a digital camera. The image capturing apparatus 10 includes an optical unit 101, a CCD 102, a timing signal generation unit 103, an A/D conversion circuit 104, an image processing circuit 105, an encoder/decoder 106, and a control unit 107. Further, the image capturing apparatus 10 includes an input unit 108, a graphic I/F (interface) 109, a display 110, an R/W (reader/writer) 111, a memory card 112, an input/output I/F 113, and a photometric sensor 114. Furthermore, the image capturing apparatus 10 may include a temperature sensor 115. The optical unit 101, the timing signal generation unit 103, the A/D conversion circuit 104, the image processing circuit 105, the encoder/decoder 106, the input unit 108, the graphic I/F 109, the R/W 111, the input/output I/F 113, and the photometric sensor 114 are connected to the control unit 107.

The optical unit 101 includes a lens for condensing light from a subject to the CCD 102, a drive mechanism for performing focusing and zooming by moving the lens, a shutter mechanism, an iris mechanism, etc. These are driven based on control signals from the control unit 107.

The CCD 102 is driven based on a timing signal output from the timing signal generation unit 103, and converts incident light from a subject into an image signal, which is an electrical signal, and outputs the image signal.

The timing signal generation unit 103 outputs a timing signal under the control of the control unit 107.

The A/D conversion circuit 104 carries out A/D conversion of an analog image signal output from the CCD 102 and outputs a digital image signal.

The image processing circuit 105 performs all or part of camera signal processing, such as demosaicking processing, white balance processing, color correction processing, AF processing, and AE processing, on a digital image signal output from the A/D conversion circuit 104.

The encoder/decoder 106 performs compression encoding processing in a predetermined still image data format, such as the JPEG format, on an image signal from the image processing circuit 105. Further, the encoder/decoder 106 performs decompression decoding processing on encoded data of a still image supplied from the control unit 107.

The control unit 107 is, for example, a microcontroller including a CPU, a ROM, a RAM, etc., and totally controls each unit of the image capturing apparatus 10 by executing programs stored in the ROM etc.

The input unit 108 includes various kinds of operation keys, for example, such as a shutter release button, a lever, and a dial, and outputs a control signal in accordance with the input operation by a user to the control unit 107.

The graphic I/F 109 generates an image signal to be displayed on the display 110 from the image signal supplied from the control unit 107 and supplies the generated signal to the display 110.

The display 110 is, for example, a liquid crystal display, and displays the image signal supplied from the graphic I/F 109. The display 110 displays a camera through image before image capturing, an image recorded in the memory card 112, etc.

To the R/W 111, the memory card 112 including a portable flash memory is connected in an attachable/detachable manner as a recording medium storing image data generated by image capturing etc. The R/W 111 writes data supplied from the control unit 107 to the memory card 112 and outputs data read from the memory card 112 to the control unit 107. As the recording medium connected to the R/W 111, for example, a writable optical disk or an HDD may be used, besides the memory card.

The input/output I/F 113 is a connection terminal, for example, such as a USB, an HDMI (registered trademark), and an HD-SDI. Via the input/output I/F 113, an image signal recorded in the memory card 112 is transmitted to an external device, such as a PC.

The photometric sensor 114 acquires brightness information of a subject and transmits the information to the control unit 107.

The temperature sensor 115 acquires temperature information of an image capturing element and transmits the information to the control unit 107.

<Basic Operation of Image Capturing Apparatus>

The basic operation of the image capturing apparatus 10 is explained. Before image capturing, light received by the CCD 102 and photoelectrically converted into a signal is supplied sequentially to the A/D conversion circuit 104. The A/D conversion circuit 104 converts the signal generated by the CCD 102 receiving light into a digital signal. The image processing circuit 105 performs image quality correction processing on the digital image signal supplied from the A/D conversion circuit 104 and supplies the signal to the graphic I/F 109 via the control unit 107 as a signal of a camera through image. The graphic I/F 109 generates an image signal to be displayed on the display 110 from the image signal supplied from the control unit 107 and supplies the image signal to the display 110. By the above series of operations, a camera through image is displayed on the display 110.

In this state, a user selects a noise amount priority mode as an image capturing mode via the input unit 108 and sets a target noise amount. Here, the target noise amount is a noise amount of an image a user desires to implement. After that, one or more image capturing conditions under which the target noise amount can be implemented are presented on the display 110 and the image capturing condition is set manually or automatically. Then, in the case where the shutter release button of the input unit 108 is pressed down, the control unit 107 outputs control signals to the optical unit 101 and the timing signal generation unit 103 and operates the shutter of the optical unit 101. Due to this, from the CCD 102, an image signal is output. The image processing circuit 105 performs image quality correction processing based on the input of the user on the image signal supplied from the CCD 102 via the A/D conversion circuit 104 and supplies the image signal after the processing to the encoder/decoder 106. The encoder/decoder 106 compresses and encodes the input image signal and supplies the generated encoded data to the R/W 111 via the control unit 107. The encoded data supplied to the R/W 111 is recorded in the memory card 112. Then, in the case where the memory card 112 is connected with an external device, such as a PC, the image data and information on image capturing conditions recorded in the memory card 112 are output to the external device via the input/output I/F 113.

<Function Configuration>

The configuration of the function of the image capturing apparatus 10 is explained. Specifically, processing to determine image capturing conditions to be used in the image capturing apparatus 10 based on instructions from the control unit 107 is explained.

Figure 2:
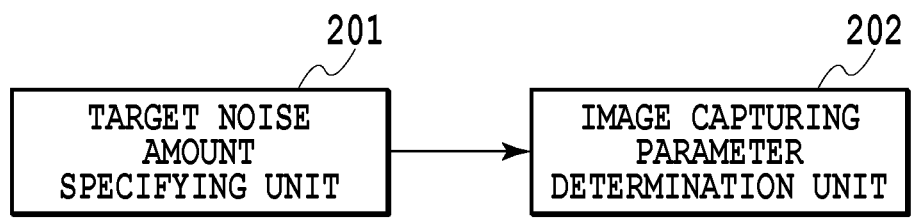
FIG. 2 is a block diagram showing the configuration of a function implemented by a control unit of the image capturing apparatus according to the first embodiment.
Figure 4:
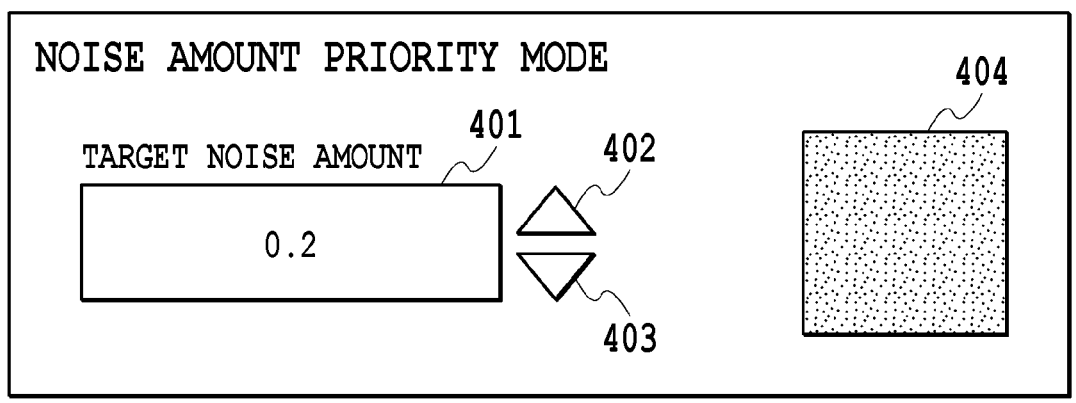
FIG. 4 is a UI displayed on a display of the image capturing apparatus according to the first embodiment.

FIG. 2 is a block diagram showing the configuration of functions implemented by the control unit 107 of the image capturing apparatus 10. In FIG. 2, a target noise amount specifying unit 201 is implemented by the control unit 107. The target noise amount specifying unit 201 acquires an image including a target noise amount specified by a user. FIG. 4 shows an example of a UI for a user to input a target noise amount. As illustrated in FIG. 4, the screen of the UI includes a numerical value input part 401, noise amount adjustment parts 402 and 403, and a noise image display part 404. To the numerical value input part 401, a numerical value is input to specify a noise amount a user desires to input a target noise amount. The noise amount adjustment parts 402 and 403 are buttons to adjust the magnitude of the numerical value of the target noise amount. On the noise image display part 404, a noise image corresponding to the target noise amount specified in the numerical value input unit 401 is displayed. Here, a noise image is a general image that is obtained by a user capturing a subject with the image capturing apparatus 10. An image displayed on the noise image display part 404 may be an image on which the noise reduction processing has already been performed inside the image capturing apparatus 10. Generally, a noise reduction processing operation is performed inside the image capturing apparatus 10, but an image on which the noise reduction processing has been performed also contains noise components. In order to adjust the noise amount included in an image while taking a picture or a movie, the noise image display part 404 displays an image to which a user wants to adjust the noise amount (i.e., the noise image). It is possible for a user to adjust the numerical value of the target noise amount in the noise image by directly inputting the numerical value to the numerical value input unit 401 or by pressing down the noise amount adjustment parts 402 and 403 while watching the noise image display part 404.

In the present embodiment, a user sets a noise amount that the user desires to acquire for an image including the target noise amount. As stated above, an image that is obtained by using the image capturing apparatus 10 contains noise components. In the present embodiment, a value based on variations in color information of each pixel within the area in a captured image is defined as the "noise amount". Noise includes various kinds of noise, such as fixed pattern noise, dark current noise, shot noise, and read noise, but in the present embodiment, the noise amount that is handled is assumed to comprise variations in color information that the noise produced by a variety of causes gives to a captured image. Further, in the present embodiment, the noise amount is the noise amount that a user desires to set, but it may also be possible to take, on the contrary, the smallness of the noise amount, such as an inverse of the noise amount, to be an evaluation index as the target amount for "smoothness in an image" and "uniformity". A calculation method of the noise amount of an image will be described later.

In FIG. 2, an image capturing parameter determination unit 202 is implemented by the control unit 107. The image capturing parameter determination unit 202 determines one or more recommended image capturing conditions based on the result of the target noise amount specifying unit 201.

<Calculation Method of Noise Amount>

Figure 14:
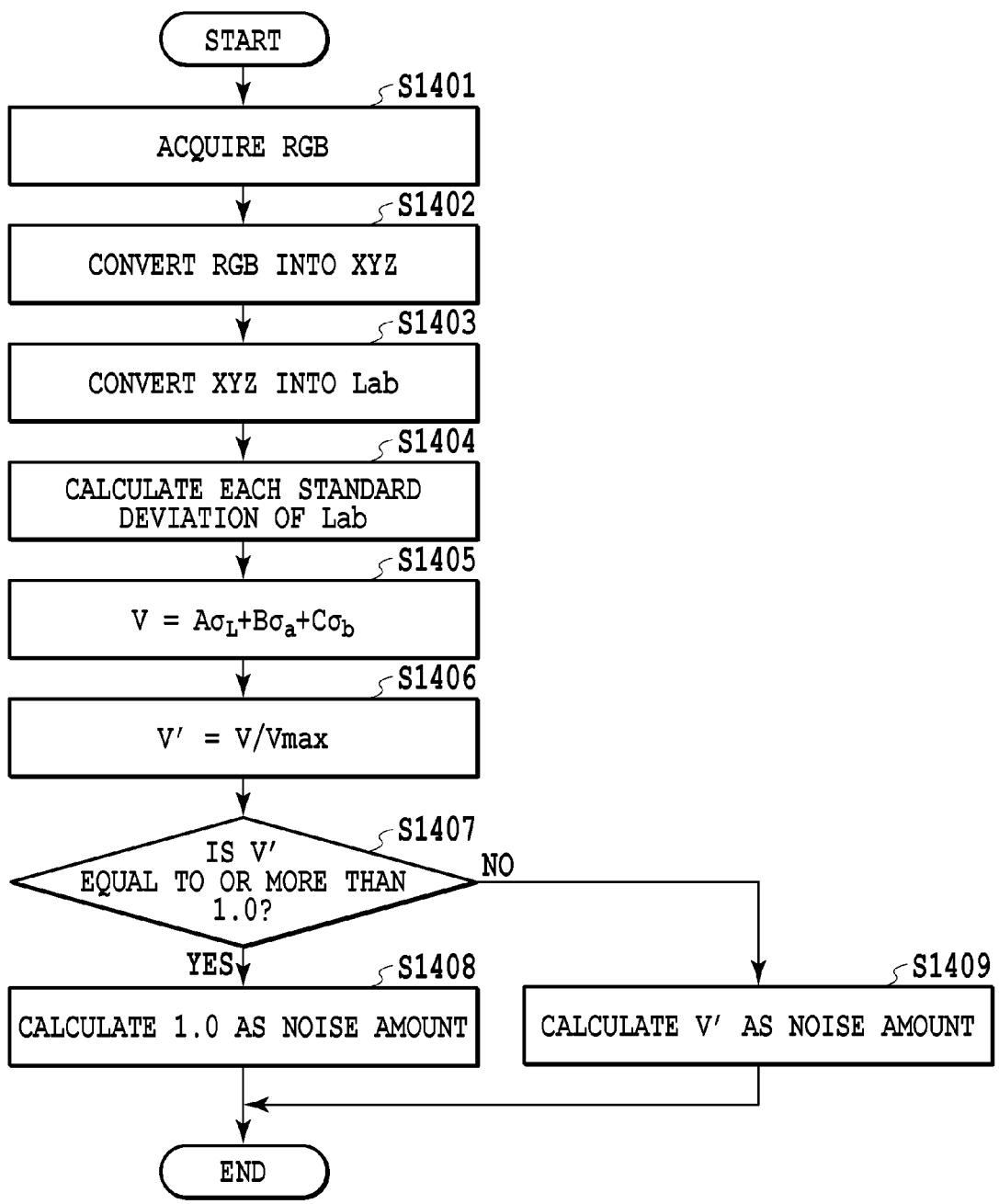
FIG. 14 is a flowchart showing a noise amount calculation method according to the first embodiment.

A method for calculating the noise amount from an image is explained by using a flowchart in FIG. 14.

First, at step S1401, RGB values of each pixel within an area of, for example, a dark part (e.g., pixel values are about 10 to 30) in which much noise is produced in an image are acquired. Next, the processing proceeds to step S1402.

At step 1402, each of the RGB values within the area is converted into each of XYZ values, which are three stimulus values. This conversion is carried out by the specified method, such as sRGB and AdobeRGB. As a specific example, conversion is carried out by using expressions (1) to (4) below.

$$R' = \left(\frac{R+\alpha}{\beta}\right)^{\gamma} \quad (1)$$

$$G' = \left(\frac{G+\alpha}{\beta}\right)^{\gamma} \quad (2)$$

$$B' = \left(\frac{B+\alpha}{\beta}\right)^{\gamma} \quad (3)$$

$$\begin{pmatrix} X \\ Y \\ Z \end{pmatrix} = \begin{pmatrix} a11 & a12 & a13 \\ a21 & a22 & a23 \\ a31 & a32 & a33 \end{pmatrix} \begin{pmatrix} R' \\ G' \\ B' \end{pmatrix} \quad (4)$$

Here, α, β, γ, and a11 to a33 are specified coefficients. Next, the processing proceeds to step S1403.

At step S1403, the XYZ values corresponding to each pixel are converted into the Lab values by using the conversion expression specified by CIE. The conversion into the Lab values as explained above is just an example. As another example, it may also be possible to cause a user to specify a color space of the displayed display and to calculate the Lab values after carrying out conversion into the color space of the displayed display. Next, the processing proceeds to step S1404.

At step S1404, for the Lab values of all the pixels within the image area, standard deviations $\sigma_L$, $\sigma_a$, and $\sigma_b$ are calculated. Next, the processing proceeds to step 1405.

At step S1405, a sum of each weighted standard deviation is calculated as an evaluation value V.

$$V = A\sigma_L + B\sigma_a + C\sigma_b \quad (5)$$

Next, the processing proceeds to step S1406.

At step S1406, V' is calculated by dividing the evaluation value V obtained at step S1405 by a supposed maximum value Vmax.

$$V' = V/V_{max} \quad (6)$$

Next, the processing proceeds to step S1407.

At step S1407, whether or not V' is equal to or more than 1 is determined. In the case where it is determined that V' is equal to or more than 1, the processing proceeds to step S1408 and in the case where it is determined that V' is less than 1, the processing proceeds to step S1409.

At step S1408, a value of 1.0 is calculated as the noise amount. In other words, in the case where V' is equal to or more than 1, the noise amount is set to 1.0.

At step S1409, V' is calculated as the noise amount. In other words, in the case where V' is less than 1, V' is taken to be the noise amount as it is. The noise amount obtained by the above calculation method will be a numerical value between 0.0 and 1.0.

Weighing coefficients A, B, and C in the expression (5) are arbitrary coefficients. By determining the weighting coefficients A, B, and C in advance so that the noise amount to be calculated agrees with the noise amount perceived by the lightness L and the color components a and b, it is possible to calculate a noise amount that agrees with the user perception.

The calculation method of the noise amount is not limited to that described above, and for example, it may also be possible to use the Wiener spectrum or the RMS granularity. Further, as another method, for example, there can also be considered a method in which an image is converted into a blurred image by applying filtering of a visual spatial frequency response to the brightness components and then the standard deviation is calculated. Furthermore, in the case of capturing a moving image, it may also be possible to calculate the noise amount of a moving image by analyzing images between a plurality of frames.

<Image Processing Performed by Control Unit>

Figure 3:
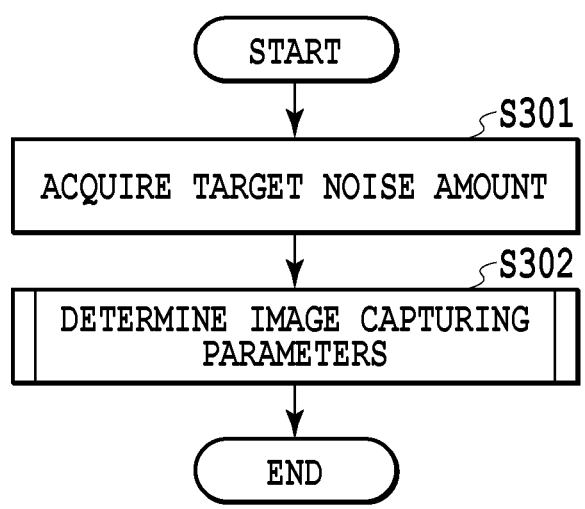
FIG. 3 is a flowchart showing a flow of image processing performed by the control unit of the image capturing apparatus according to the first embodiment.

FIG. 3 is a flowchart of image processing performed by the control unit 107.

First, at step S301, the target noise amount specifying unit 201 acquires the target noise amount specified by a user and stores the acquired target noise amount in the RAM. Next, the processing proceeds to step S302.

At step S302, the image capturing parameter determination unit 202 determines image capturing parameters for obtaining a captured image with the specified target noise amount. The image capturing parameter determination unit 202 controls the image capturing apparatus 10 so as to capture an image based on the determined image capturing parameters.

<Image Capturing Condition (Image Capturing Parameter) Determination Processing>

Figure 5:
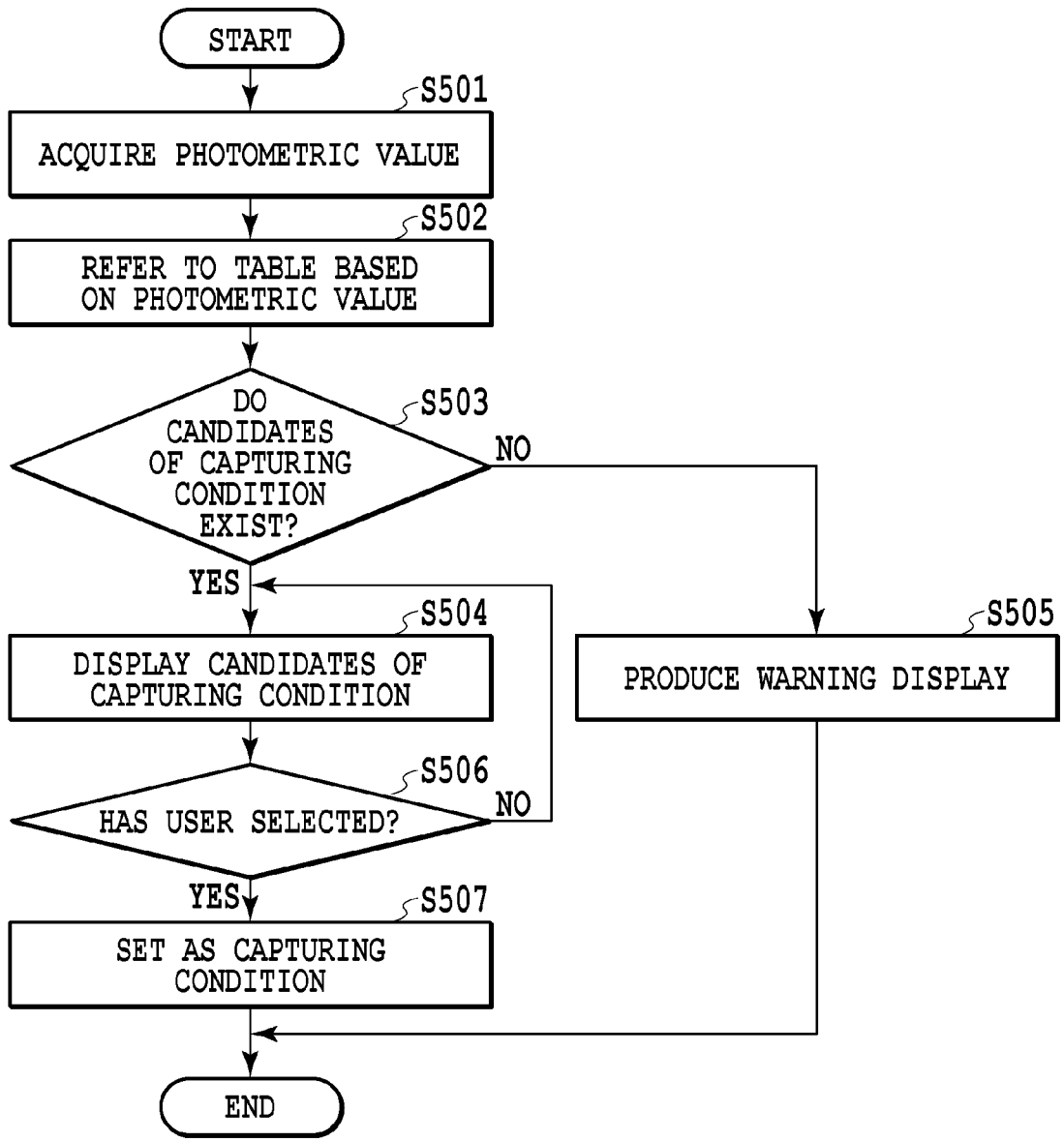
FIG. 5 is a flowchart showing the flow of steps of image capturing condition determination processing according to the first embodiment.
Figure 15:
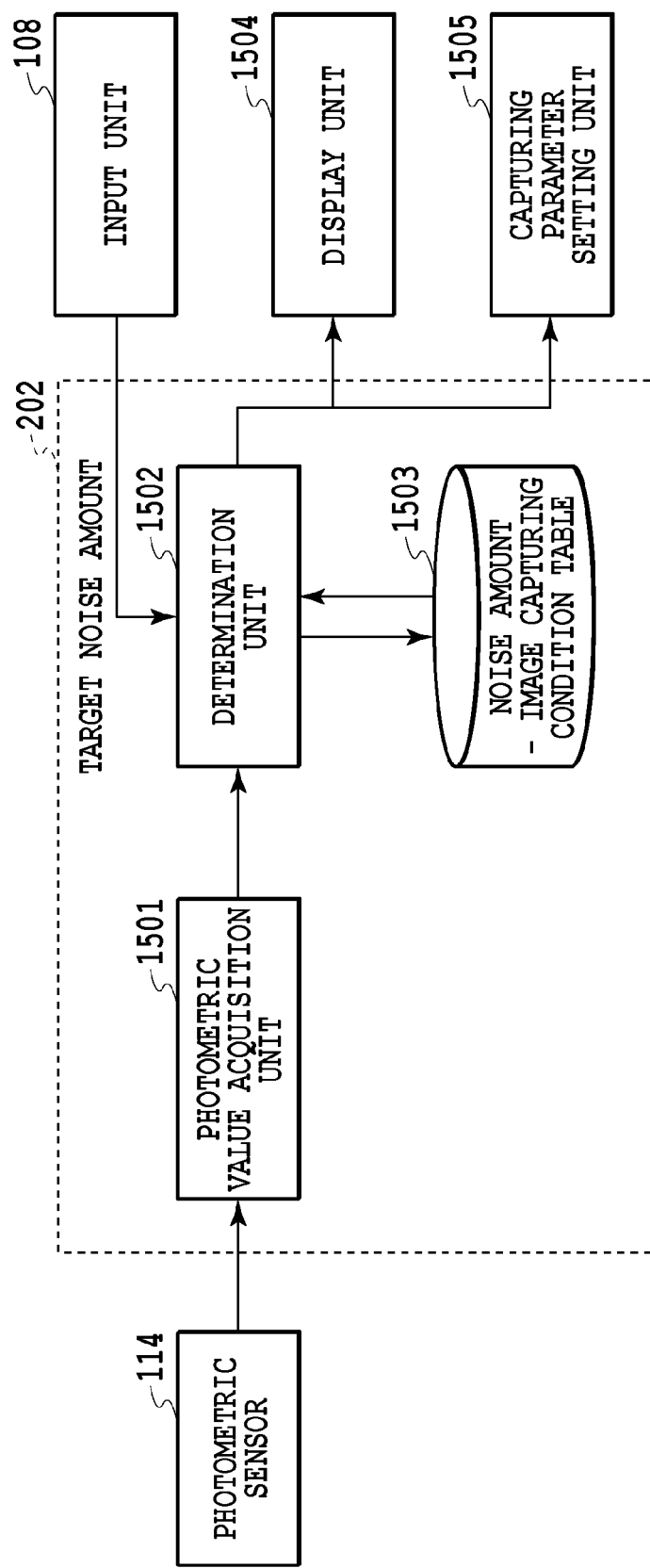
FIG. 15 is a block diagram showing the configuration of a function of an image capturing parameter determination unit according to the first embodiment.

Next, image capturing parameter determination processing at step S302 in FIG. 3 is explained by using a block diagram in FIG. 15 and a flowchart in FIG. 5.

FIG. 15 is a block diagram for illustrating the detailed configuration of the function of the image capturing parameter determination unit 202. The image capturing parameter determination unit 202 includes a photometric value acquisition unit 1501 configured to acquire a measurement value from the photometric sensor 114, a determination unit 1502, and a storage unit 1503 in which a noise amount—image capturing condition table is stored. The determination unit 1502 is connected to a display unit 1504 for displaying a UI, which includes the graphic I/F 109 and the display 110. Further, the determination unit 1502 is connected with the input unit 108 for a user to make a selection on the UI. Furthermore, the determination unit 1502 is connected to with an image capturing parameter setting unit 1505 configured to set an image capturing condition to the image capturing apparatus.

FIG. 5 is a flowchart of image capturing condition determination processing. Referring to FIG. 5, first, at step S501, the photometric value acquisition unit 1501 acquires an output value (hereinafter, referred to as a photometric value) of the photometric sensor 114 as brightness information of a subject and sends the photometric value to the determination unit 1502. In the present embodiment, a reference table for each photometric value, in which the noise amount and image capturing conditions for capturing an image with the noise amount are associated, is stored in advance in the RAM or the ROM within the control unit 107 and the relevant table is referred to based on the photometric value acquired at step S501. FIG. 6 shows an example of the reference table. In FIG. 6, in the leftmost column of the reference table, the noise amount is illustrated and for each noise amount, setting values (i.e. image capturing parameters) related to image capturing conditions, such as the ISO speed, the shutter speed, and the aperture, are illustrated. The creation method of the reference table will be described later. Next, the processing proceeds to step S502.

At step S502, the determination unit 1502 refers to the corresponding table based on the acquired photometric value. Next, the processing proceeds to step S503.

At step S503, the determination unit 1502 determines whether or not there are image capturing conditions that can acquire the image including the target noise amount within the table. In the case where it is determined that there are image capturing conditions that can acquire the image with the target noise amount within the table, the processing proceeds to step S504 and in the case where it is determined that there are not image capturing conditions that can acquire the image with the target noise amount within the table, the processing proceeds to step S505.

Figure 7:
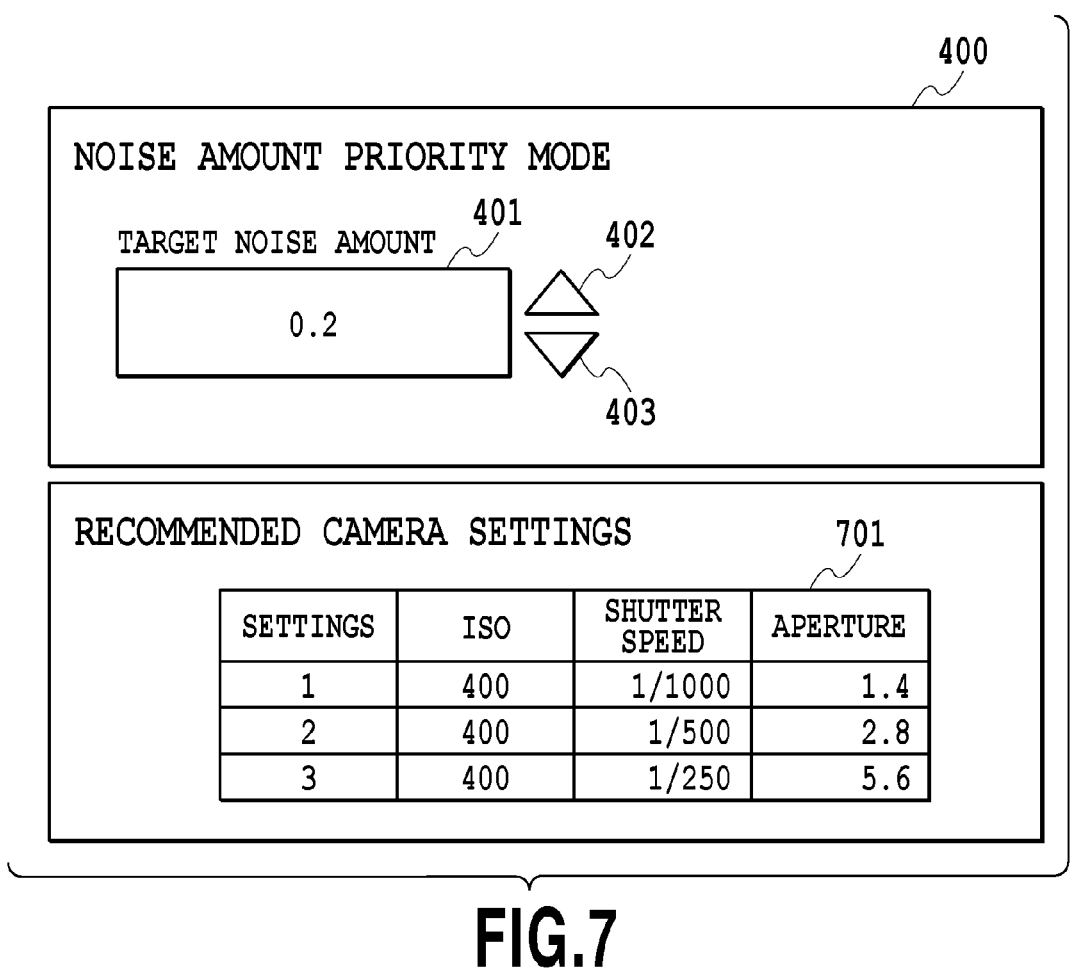
FIG. 7 is a UI displayed on the display of the image capturing apparatus according to the first embodiment.

At step S504, the determination unit 1502 displays one or more image capturing conditions that can acquire the image with the target noise amount as candidates on the display unit 1504. FIG. 7 shows an example of the UI of the graphic I/F 109 displayed on the display 110. A UI 400 on which to input the target noise amount includes the numerical value input part 401 and the noise amount adjustment parts 402 and 403 as in FIG. 4 and to the numerical value input part 401, a numerical value to specify a noise amount that a user desires to acquire is input as the target noise amount.

Together with the UI 400, an image capturing condition display part 701 for presenting image capturing conditions that can implement the target noise amount is displayed. Usually, the number of image capturing conditions for acquiring the image with the target noise amount is not one, but two or more. Consequently, in the case where there are two or more candidates of image capturing condition, a plurality of image capturing conditions (setting 1, setting 2, setting 3) is displayed as illustrated in FIG. 7. Next, the processing proceeds to step S506.

At step S505, the determination unit 1502 causes the display unit 1504 to display a warning display to the effect that there are not image capturing conditions corresponding to the target noise amount input by a user through the input unit 108.

At step S506, the determination unit 1502 determines whether or not a user has selected any of the candidates of the image capturing condition. In the case where it is determined that a user has selected any of the candidates of the image capturing condition, the processing proceeds to step S507 and in other cases, the processing returns to step S504.

At step S507, the image capturing parameter setting unit 1505 sets the candidates of image capturing condition selected by the user as the image capturing condition of the image capturing apparatus.

In the present embodiment, image capturing conditions corresponding to the noise amount are determined by using the reference table, but image capturing conditions may be determined by using another method. As another method, for example, a method is considered, in which image capturing conditions are filtered to those suitable to the brightness of a subject on a program chart prepared in advance, and then whether or not each of the image capturing conditions can implement the target noise amount is determined and thus the image capturing conditions are determined.

<Creation Method of Reference Table>

An example of the creation method of a reference table is explained. First, a target image capturing apparatus (camera), a color chart including uniform patches in a plurality of colors (Macbeth chart etc.), and a light source capable of adjusting the amount of light are prepared. Next, under a certain light source, image capturing is performed with an f-stop that implements an appropriate exposure while changing the ISO speed and the shutter speed, which comprise image capturing conditions of the camera. This image capturing is repeated while changing the amount of light of the light source. After image capturing under all the conditions is completed, the noise amount is calculated for the area of each patch of a captured image. Finally, by recording the noise amount of the patch whose noise amount is the largest (generally, the gray patch of shadow) among the noise amounts of the respective patches and the image capturing conditions in the reference table, it is possible to create a reference table for each light source. As a method other than this, it may also be possible to create a reference table in advance for each typical color. In such a case, it is sufficient to refer to the noise table of the color whose noise amount is the largest for the color distribution of a subject at the time of image capturing.

Here, the general relationship between each of the ISO speed, the shutter speed, and the aperture, and the noise amount in the reference table is explained. In the case where the ISO speed is increased, both the fixed pattern noise and the random noise increase and the noise amount of the entire image increases. In the case where the shutter speed is set slower, the fixed pattern noise increases, and therefore, the noise amount of the entire image increases. The aperture does not affect the noise amount in the case where image capturing is performed with an appropriate exposure, but in the case where the aperture is opened and the amount of light to the sensor is increased more than the appropriate exposure, the noise amount decreases. In the reference table, besides the above-described image capturing parameters, the ND filter that adjusts the amount of light and the model of the lens may be combined.

As above, according to the present embodiment, a user sets a desired noise amount as a parameter "target noise amount" and image capturing conditions in accordance with the target noise amount are presented by the image capturing apparatus. Consequently, it is possible for a user to obtain a captured image with a desired noise amount by setting the presented image capturing condition. Further, by presenting a plurality of image capturing conditions that implement the target noise amount to a user and thus giving alternatives, it is possible to increase the degree of freedom in image capturing of a user.

Second Embodiment

In the first embodiment, in the case where there are a plurality of image capturing conditions that can acquire the image with the target noise amount, it is necessary for a user to manually select and set an image capturing condition. Consequently, in the present embodiment, there is provided an image capturing apparatus that automatically sets an image capturing condition that can acquire the image with the target noise amount based on the image capturing parameter that is prioritized, such as in where the aperture is prioritized or the shutter speed is prioritized.

In the present embodiment, the configuration of the image capturing apparatus, the function configuration of the control unit (CPU) of the image capturing apparatus, and the basic operation of the image processing performed by the control unit are the same as those in the first embodiment (see FIG. 1 to FIG. 3).

Figure 8:
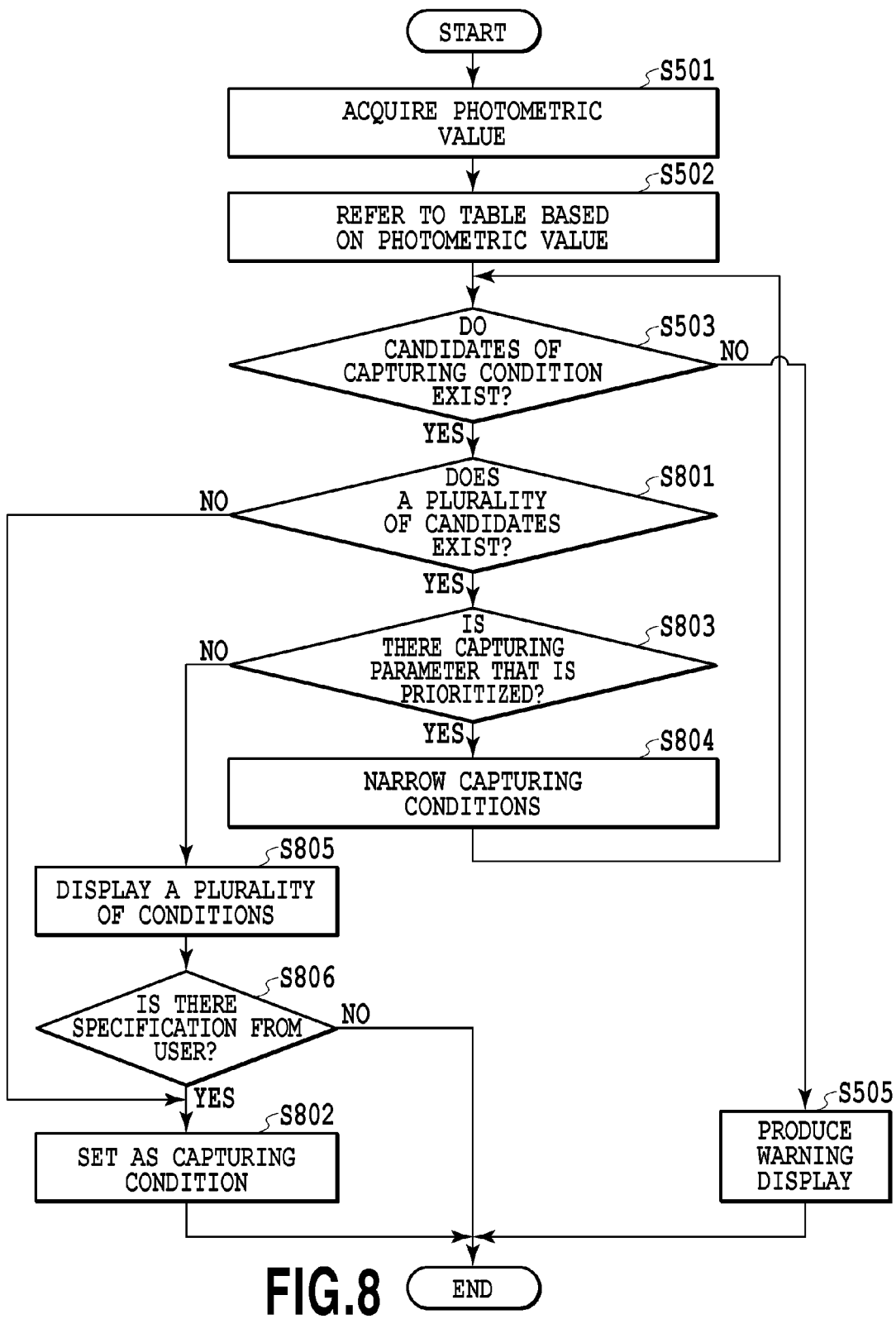
FIG. 8 is a flowchart showing the flow of steps of image capturing condition determination processing according to a second embodiment.
Figure 16:
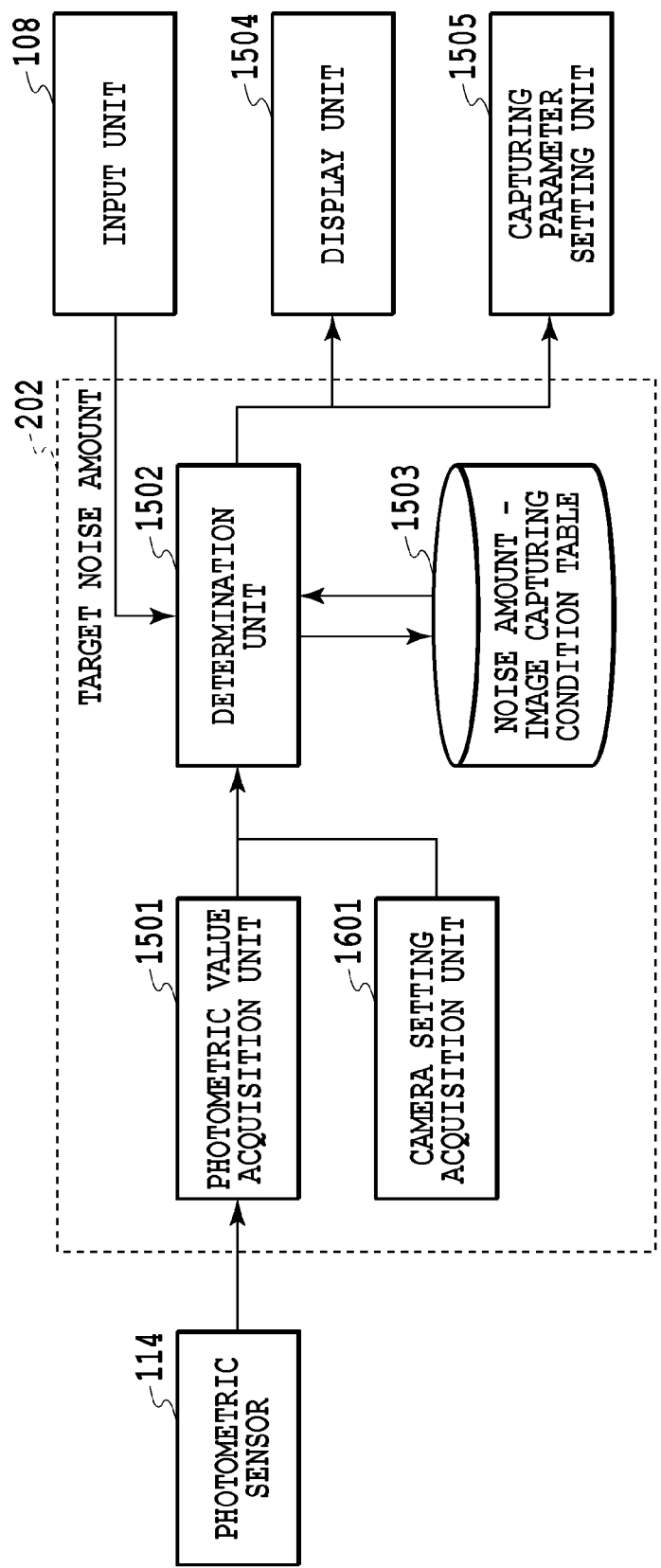
FIG. 16 is a block diagram showing the configuration of a function of an image capturing parameter determination unit according to the second embodiment.

Here, the operation of the image capturing parameter determination unit 202 in the present embodiment is explained by using a block diagram in FIG. 16 and a flowchart in FIG. 8.

Referring to FIG. 16, the image capturing parameter determination unit 202 includes the photometric value acquisition unit 1501, the determination unit 1502, and the storage unit 1503 in which the noise amount—image capturing condition table is stored, and this is the same as in the first embodiment. Further, the determination unit 1502 is connected to the input unit 108, the display unit 1504, and the image capturing parameter setting unit 1505, and this is also the same as in the first embodiment. The present embodiment differs from the first embodiment in that the image capturing parameter determination unit 202 includes a camera setting acquisition unit 1601 configured to acquire a setting condition, such as an image capturing mode of the image capturing apparatus (camera).

Subsequently, FIG. 8 is referred to. Steps S501 to S503, and S505 in FIG. 8 are the same as steps S501 to S503, and S505 in FIG. 5, and therefore, an explanation thereof is omitted. Hereinafter, the difference between the present embodiment and the first embodiment is explained.

At step S801, the determination unit 1502 determines whether or not there exists a plurality of candidates of the image capturing condition. In the case where it is determined that there exists a plurality of candidates of the image capturing condition, the processing proceeds to step S803 and in the case where it is determined that there exists only one candidate of the image capturing condition, the processing proceeds to step S802.

At step S802, the image capturing parameter setting unit 1505 automatically sets the candidate of image capturing condition as the image capturing condition in the case where there exists only one candidate, or sets the candidate of image capturing condition specified manually by a user from the plurality of candidates as the image capturing condition.

At step S803, the camera setting acquisition unit 1601 acquires a setting condition of the camera, such as the shutter speed priority mode and the aperture priority mode, and determines whether or not there is an image capturing parameter that is prioritized. In the case where it is determined that there is an image capturing parameter that is prioritized, the processing proceeds to step S804 and in the case where it is determined that there is no image capturing parameter that is prioritized, the processing proceeds to step S805.

At step S804, the determination unit 1502 filters image capturing conditions in accordance with the image capturing parameter that is prioritized. For example, in the case where the setting of the camera is the shutter speed priority mode, the determination unit 1502 filters image capturing conditions while prioritizing the current shutter speed. Further, it may also be possible to filter image capturing conditions while fixing any one or more image capturing parameters, such as while prioritizing the aperture and also fixing the ISO speed. Furthermore, it may also be possible to filter image capturing conditions in accordance with the image capturing parameter prioritized by each image capturing mode, such as the landscape mode and the portrait mode. Next, the processing returns to step S503.

At step S805, in the case where there is no image capturing parameter that is prioritized, and therefore, it is not possible to filter image capturing conditions, the determination unit 1502 displays a plurality of candidates of the image capturing condition on the display unit 1504. Next, the processing proceeds to step S806.

At step S806, the determination unit 1502 determines whether or not there is a specification from a user. In the case where it is determined that there is a specification from a user, the processing moves to step S802 and in the case where it is determined that there is no specification from a user, the image capturing condition determination processing is exited.

As above, according to the present embodiment, in the case where there are a plurality of image capturing conditions that can implement the target noise amount, the image capturing apparatus automatically determines image capturing conditions by taking into consideration in advance the image capturing parameter prioritized by a user, and therefore, it is possible for a user to, without time and effort, filter and select an image capturing condition.

Third Embodiment

In general, as the temperature rises, the fixed pattern noise increases and the noise amount of the entire image increases. However, in the first embodiment, in the case where the temperature of the image capturing element of the image capturing apparatus (camera) changes, it is not possible to acquire the image including the exact noise amount. Consequently, in the present embodiment, there is provided an image capturing apparatus capable of obtaining an image with a noise amount desired by a user even in the case where the temperature of the image capturing element changes. In the present embodiment, the configuration of the image capturing apparatus is the same as that in the first embodiment, and therefore, an explanation thereof is omitted (see FIG. 1).

Figure 9:
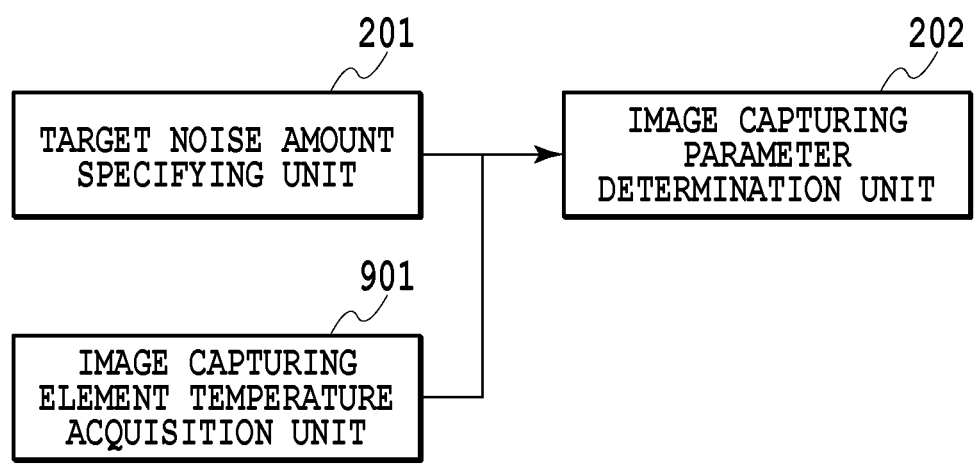
FIG. 9 is a block diagram showing the configuration of a function implemented by a control unit of an image capturing apparatus according to a third embodiment.

FIG. 9 is a block diagram showing the configuration of a function implemented by the control unit of the image capturing apparatus according to the present embodiment. In FIG. 9, the target noise amount specifying unit 201 acquires the target noise amount input by a user as in the first embodiment. An image capturing element temperature acquisition unit 901 acquires the temperature of the image capturing element from the temperature sensor 115. In the present embodiment, the image capturing parameter determination unit 202 corrects the target noise amount acquired by the target noise amount specifying unit 201 based on the result of the image capturing element temperature acquisition unit 901.

Figure 10:
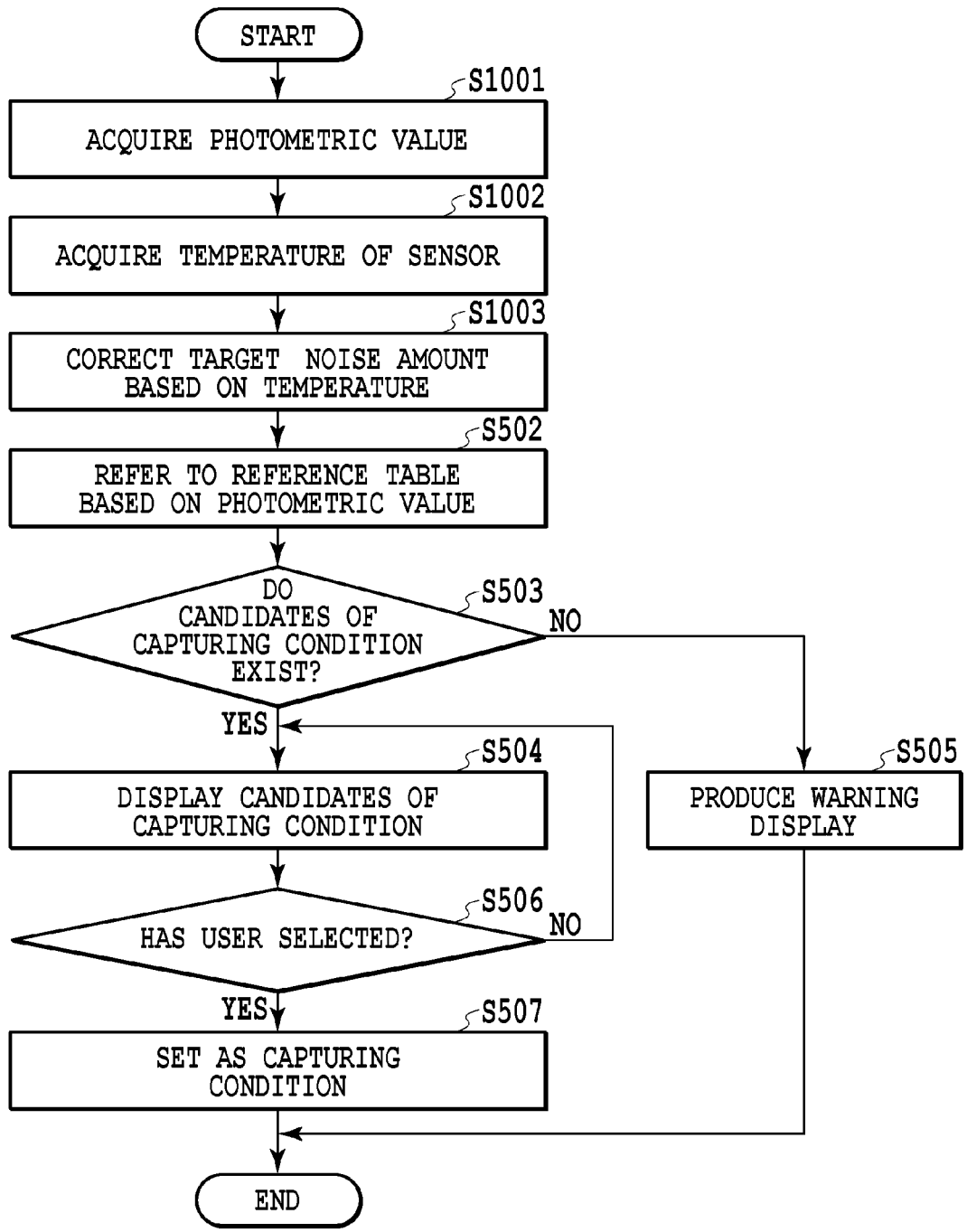
FIG. 10 is a flowchart showing the flow of steps of image capturing condition determination processing according to the third embodiment.
Figure 17:
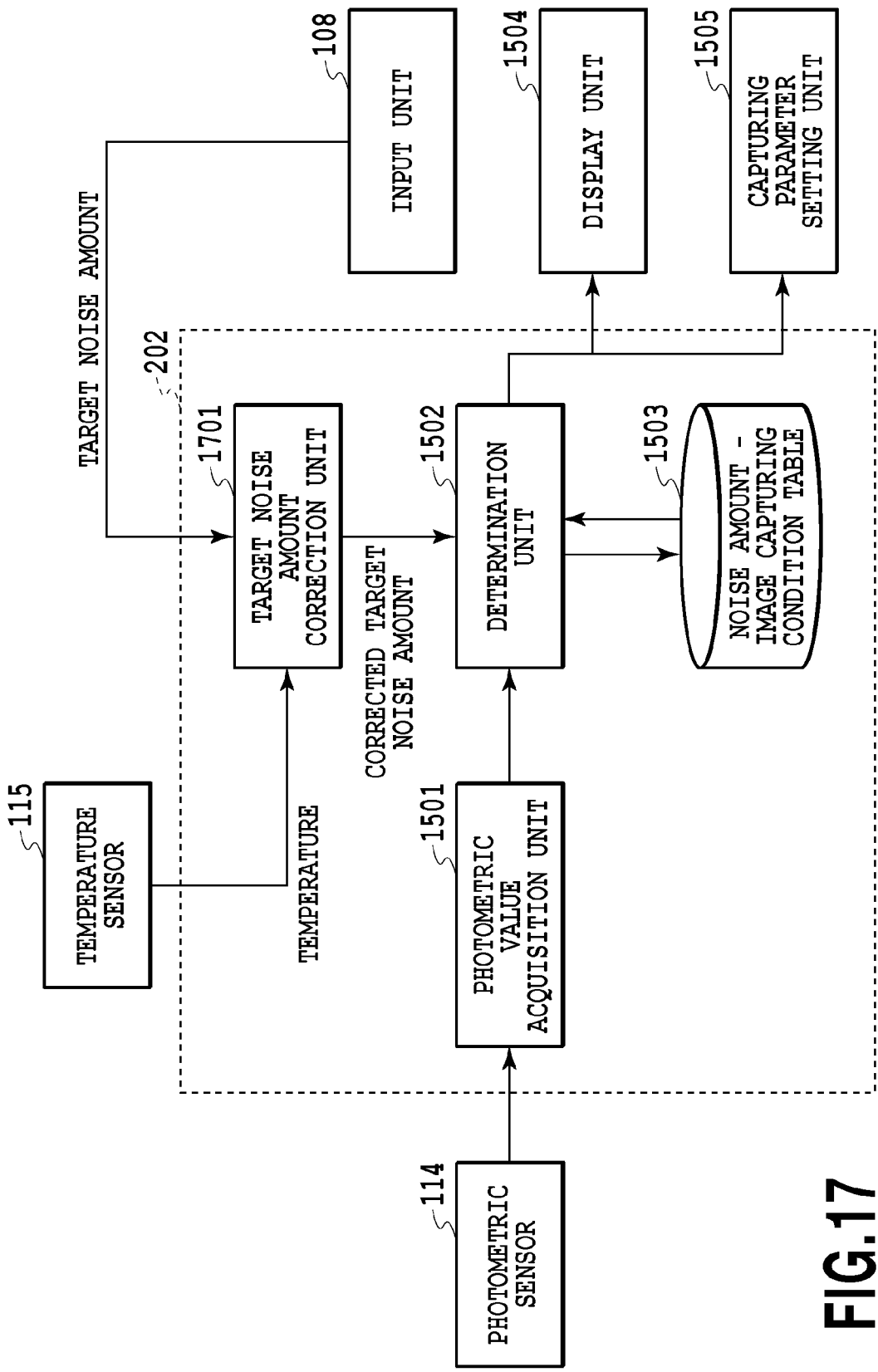
FIG. 17 is a block diagram showing the configuration of a function of an image capturing parameter determination unit according to the third embodiment.

Here, the operation of the image capturing parameter determination unit 202 in the present embodiment is explained by using a block diagram in FIG. 17 and a flowchart in FIG. 10.

Referring to FIG. 17, the image capturing parameter determination unit 202 includes the photometric value acquisition unit 1501, the determination unit 1502, and the storage unit 1503 in which the noise amount-image capturing condition table is stored, and this is the same as in the first embodiment. Further, the determination unit 1502 is connected with the display unit 1504 and the image capturing parameter setting unit 1505, and this is also the same as in the first embodiment.

The present embodiment differs from the first embodiment in that the image capturing parameter determination unit 202 further includes a target noise amount correction unit 1701 configured to correct the target noise amount based on temperature information from the temperature sensor 115. Further, the present embodiment differs from the first embodiment in that the determination unit 1502 connects with the input unit 108 via the target noise amount correction unit 1701.

Referring to FIG. 10, first, at step S1001, the photometric value acquisition unit 1501 acquires a photometric value. Next, the processing proceeds to step S1002.

At step S1002, the target noise amount correction unit 1701 acquires the temperature T from the temperature sensor 115. Next, the processing proceeds to step S1003.

At step S1003, the target noise amount correction unit 1701 corrects the target noise amount based on the temperature. The corrected target noise amount is calculated by expression (7) below set in advance.

$$P = P_0 \exp(k(T-T_0)) \tag{7}$$

In the expression (7), P is a target noise amount specified by a user at the temperature T and $P_0$ is a target noise amount at reference temperature $T_0$. Further, k is a coefficient derived from the relationship between the target noise amount and the temperature, and is also a coefficient affecting the ISO speed. As is seen from the expression (7), the noise amount of an image tends to increase as the temperature rises. The expression to derive the corrected target noise amount changes depending on the definition of the target noise amount P and is not limited to that in the present embodiment. In the present embodiment, as in the first embodiment, the reference table in which the noise amount and the image capturing condition are associated is stored in the storage unit 1503. Here, it is assumed that the reference table held by the storage unit 1503 is for setting the image capturing conditions at the reference temperature $T_0$. Consequently, in the present embodiment, based on the temperature T acquired by the temperature sensor, the target noise amount P specified by a user is corrected by using expression (8) below. The expression (7) is modified as below.

$$P_0 = P/\exp(k(T-T_0)) \quad (8)$$

In the expression (8), a corrected target noise amount $P_0$ to be referred to in the table is calculated from the temperature T of the temperature sensor and the target noise amount P from a user. In other words, in the case where the temperature T is higher than the reference temperature $T_0$, the denominator in the expression (8) is equal to or more than 1, and therefore, a value smaller than the target noise amount P specified by a user is referred to as the corrected target noise amount $P_0$. Further, in the case where the temperature T is lower than the reference temperature $T_0$, the denominator in the expression (8) is less than 1, and therefore, a value larger than the target noise amount P specified by a user is referred to as the corrected target noise amount $P_0$.

Subsequent steps S502 to S507 are the same as steps S502 to S507 in FIG. 5, and therefore, an explanation thereof is omitted.

In the present embodiment, only the reference table for the reference temperature is stored in the storage unit and the noise amount to be referred to is changed in accordance with the temperature of the image capturing element acquired by the temperature sensor, but the present invention is not limited to this. For example, in an aspect in which the reference tables corresponding to a plurality of temperatures are stored in the storage unit, it may also be possible to refer to the table in accordance with the temperature acquired by the temperature sensor.

As above, according to the present embodiment, the image capturing conditions are determined in accordance with the temperature information of the image capturing element acquired by the temperature sensor, and therefore, it is possible to appropriately implement the noise amount of an image.

Fourth Embodiment

In the first embodiment, image capturing conditions are determined by referring to the table in which the noise amount and image capturing parameters are associated. Further, in the third embodiment, by taking into consideration the temperature from the temperature sensor, the noise amount of a captured image is controlled with high accuracy. However, there is case where the image with a desired noise amount is not obtained due to the reflection characteristics of a subject, the environmental factors, the change of the image capturing apparatus with the passage of time, etc., even by performing image capturing under the image capturing condition determined in the above-described embodiments. Consequently, in the present embodiment, the noise amount is calculated from a captured image and image capturing conditions (image capturing parameters) are modified.

Figure 11:
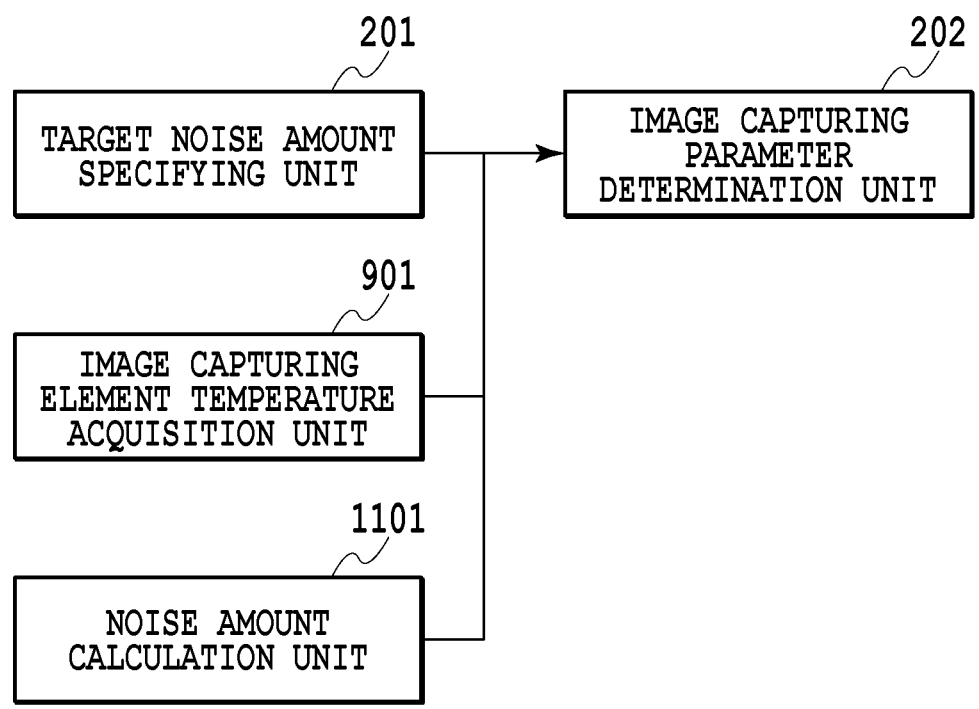
FIG. 11 is a block diagram showing the configuration of a function implemented by a control unit of an image capturing apparatus according to a fourth embodiment.

In the present embodiment, the configuration of the image capturing apparatus is the same as that in the first embodiment, and therefore, an explanation thereof is omitted (see FIG. 1). Here, a block diagram showing a function implemented by the control unit of the image capturing apparatus according to the present embodiment is shown in FIG. 11. Referring to FIG. 11, the present embodiment is the same as the third embodiment in including the target noise amount specifying unit 201, the image capturing element temperature acquisition unit 901, and the image capturing parameter determination unit 202 (see FIG. 9). The present embodiment differs from the third embodiment in further including a noise amount calculation unit 1101 configured to calculate the noise amount of a captured image. In the present embodiment, image capturing parameters are corrected based on the noise amount of a captured image calculated by the noise amount calculation unit 1101. In the present embodiment, the configuration of the function of the image capturing parameter determination unit 202 is the same as that in the third embodiment, and therefore, an explanation thereof is omitted (see FIG. 17).

<Image Processing Performed by Control Unit>

Figure 12:
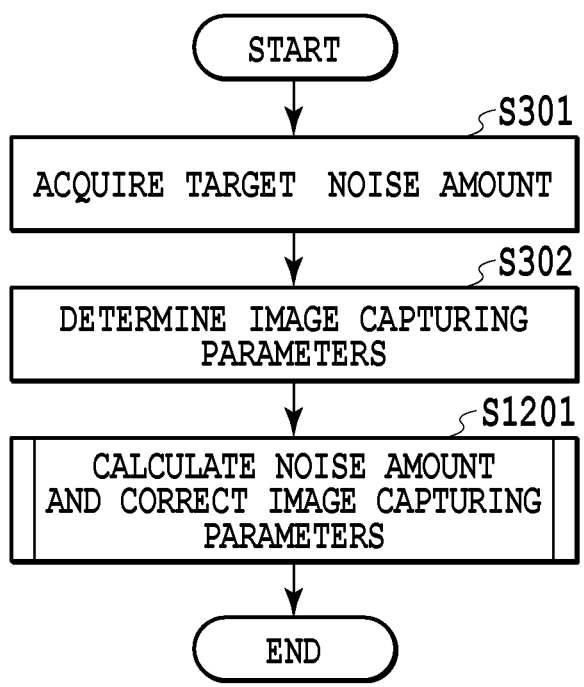
FIG. 12 is a flowchart showing the flow of steps of image processing performed by the control unit of the image capturing apparatus according to the fourth embodiment.

FIG. 12 is a flowchart of image processing performed by the control unit 107. Steps S301 and S302 in FIG. 12 are the same as those in the first embodiment, and therefore, explanation is omitted (see FIG. 3).

Figure 13:
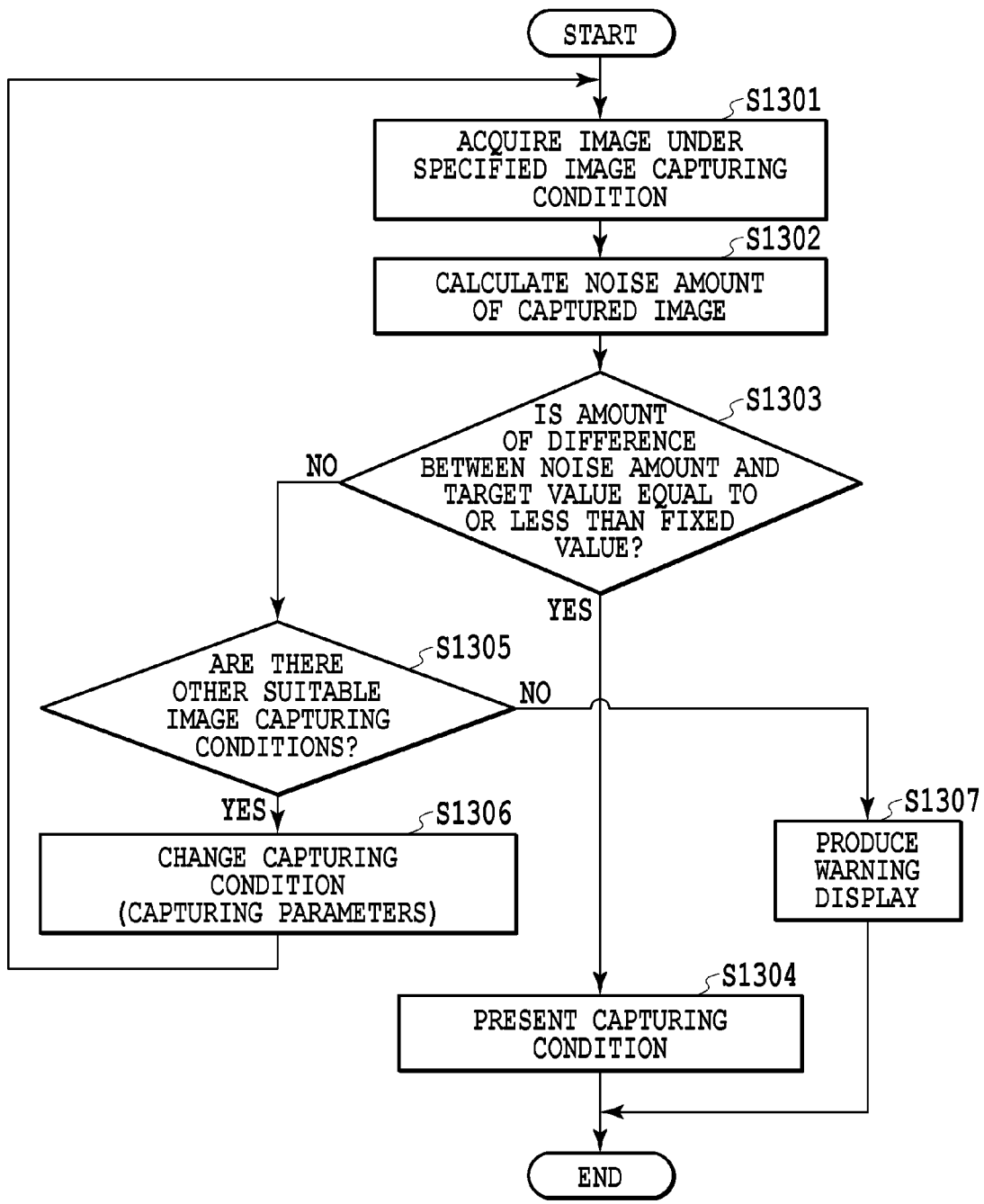
FIG. 13 is a flowchart showing the flow of steps of image capturing condition determination processing according to the fourth embodiment.

At step S1201 after step S302, the noise amount calculation unit 1101 calculates the noise amount of a captured image. Then, in the case where the difference between the calculated noise amount and the target noise amount is large, the image capturing parameter determination unit corrects the image capturing parameters. Hereinafter, the operation at step S1201 is explained in detail by using a flowchart in FIG. 13.

First, at step S1301, an image is acquired by performing image capturing with the image capturing parameters determined at step S302. Next, the processing proceeds to step S1302.

At step S1302, the noise amount calculation unit 1101 calculates the noise amount from the image acquired at step S1301. The calculation method of the noise amount is the same as the method explained in the first embodiment. Next, the processing proceeds to step S1303.

At step S1303, the determination unit 1502 determines whether or not the noise amount calculated from the captured image is close to the target value. In the present embodiment, an explanation is given on the assumption that the target noise amount specified by a user has the same meaning as that of the noise amount calculated at step S1302. The determination unit 1502 compares the target noise amount P that is targeted and a noise amount P' calculated from the captured image by using the expression (6), and determines whether or not the absolute value of the difference between the target noise amount P and the calculated noise amount P' is equal to or less than a predetermined value in accordance with expression (9) below.

$$|P-P'| \leq x \quad (9)$$

In the expression (9), x is an arbitrary numerical value and is a threshold value used to evaluate the difference between noise amounts. In the case where the absolute value of the difference is equal to or less than x, it is determined that the noise amount targeted by the user is implemented for the captured image and then the processing proceeds to step S1304. In the case where the absolute value of the difference is larger than the predetermined value, it is determined that the noise amount targeted by the user is not implemented for the captured image and then the processing proceeds to step S1305. In the present embodiment, an explanation is given on the assumption that the noise amount calculated at step S1302 and the target noise amount specified by a user have the same meaning, but they may not have the same meaning. In such a case, it is sufficient to store the correspondence relationship between the noise amount of the captured image and the target noise amount in advance by using a table or a mathematical expression and to change the noise amount calculated from the captured image into the target noise amount and then to compare the target noise amount with the target noise amount that is targeted.

At step S1304, the determination unit 1502 presents an image capturing condition. Specifically, the determination unit 1502 displays the image capturing condition on the display unit 1504.

At step S1305, the determination unit 1502 determines whether or not there are other suitable image capturing conditions. In the case where it is determined that there are other suitable image capturing conditions, the processing proceeds to step S1306 and in the case where it is determined that there are no more image capturing conditions to be changed, the processing proceeds to step S1307.

At step S1306, the determination unit 1502 changes the image capturing condition (image capturing parameters). In the changing method of the image capturing condition, for example, in the case where the noise amount calculated from the captured image is larger than the target noise amount that is targeted, the target noise amount is reduced and then the image capturing condition is changed by referring to the table in which the noise amount and the image capturing parameters are associated. Next, the processing returns to step S1301 and image capturing is performed under the changed image capturing condition and thus an image is acquired again.

At step S1307, the determination unit 1502 displays a warning display to the effect that there are no image capturing conditions corresponding to the target noise amount input by the user on the display unit 1504.

As above, according to the present embodiment, the noise amount is calculated for an actually captured image and then an image capturing condition is determined, and therefore, it is made possible to determine an image capturing condition that implements the desired noise amount more faithfully with high accuracy.

Fifth Embodiment

In the first to fourth embodiments, a user sets an image capturing condition by selecting a recommended image capturing condition presented by the image capturing apparatus or the image capturing apparatus automatically sets the recommended image capturing condition. Here, in the case where a user further adjusts the image capturing condition by him/herself without depending on the recommended image capturing conditions, it is difficult to check how much the noise amount has occurred with respect to the target.

Consequently, an image capturing apparatus according to the present embodiment further includes a display control unit configured to display the relationship between the noise amount of a captured image and the target noise amount. With the image capturing apparatus according to the present embodiment, it is made possible for a user to easily adjust the image capturing condition while grasping the noise amount of a captured image. In the present embodiment, the configuration of the image capturing apparatus is the same as that in the first embodiment, and therefore, an explanation thereof is omitted (see FIG. 1).

Figure 18:
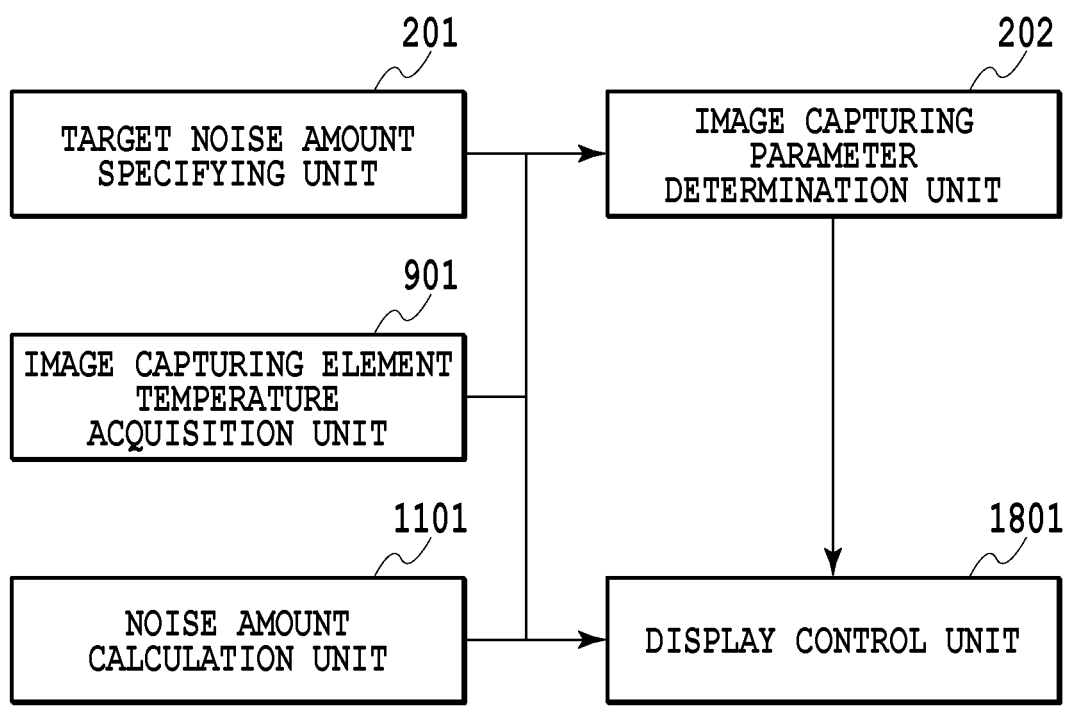
FIG. 18 is a block diagram showing the configuration of a function implemented by a control unit of an image capturing apparatus according to a fifth embodiment.

A block diagram showing the configuration of a function implemented by the control unit of the image capturing apparatus according to the present embodiment is shown in FIG. 18. Referring to FIG. 18, the present embodiment is the same as the fourth embodiment in including the target noise amount specifying unit 201, the image capturing element temperature acquisition unit 901, the noise amount calculation unit 1101, and the image capturing parameter determination unit 202 (see FIG. 11). The present embodiment differs from the fourth embodiment in further including a display control unit 1801 configured to control a display based on the result by the target noise amount specifying unit 201 and the result by the noise amount calculation unit 1101.

Figure 19:
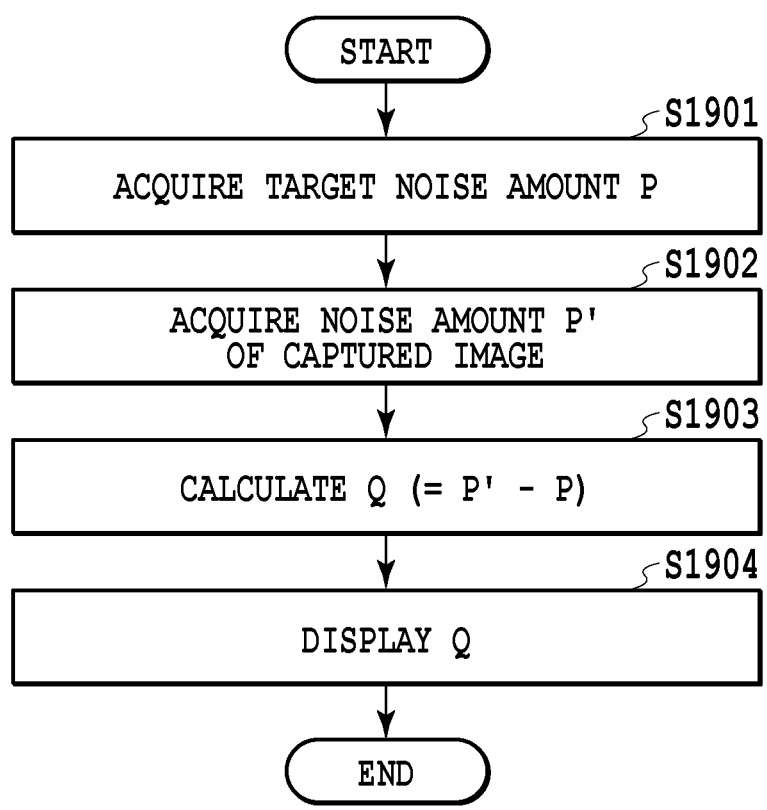
FIG. 19 is a flowchart showing the flow of steps of the processing performed by a display control unit according to the fifth embodiment.

Next, the operation of the display control unit 1801 is explained by using a flowchart in FIG. 19.

First, at step S1901, the display control unit 1801 acquires the target noise amount P from the target noise amount specifying unit 201.

Next, at step S1902, the display control unit 1801 acquires the noise amount P' for the captured image from the noise amount calculation unit 1101.

Nest, at step S1903, the display control unit 1801 calculates a difference Q between the target noise amount P acquired at step S1901 and the noise amount P' acquired at step S1902.

$$Q=P'-P \qquad (10)$$

Figure 20:
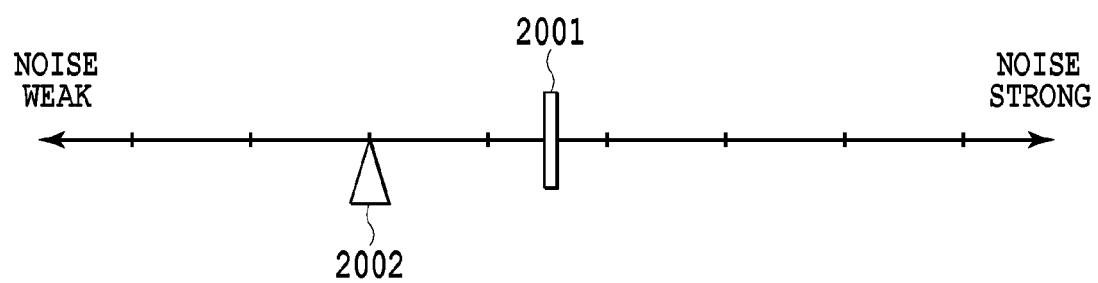
FIG. 20 is an example of a screen displayed by the display control unit according to the fifth embodiment.

Finally, at step S1904, the display control unit 1801 displays the value of Q calculated at step S1903 on the display 110. Alternatively, as illustrated in FIG. 20, it may also be possible to indicate the relationship between the target noise amount P and the noise amount P' by displaying an indicator 2002 with respect to a scale pointer 2001 indicating the target noise amount. The indicator 2002 is displayed to the left of the scale pointer 2001 in the case where the noise amount of the captured image is smaller than the target noise amount and is displayed to the right of the scale pointer 2001 in the case where the noise amount of the captured image is larger than the target noise amount.

As above, according to the present embodiment, by displaying the relationship between the noise amount of a captured image and the target noise amount, the current noise amount is displayed with respect to the target noise amount each time a user changes the image capturing condition, and therefore, it is made possible for a user to adjust the image capturing condition while checking the noise amount.

Sixth Embodiment

By the fifth embodiment, it is possible to make clear the relationship between the noise amount that is targeted and the current noise amount calculated from a captured image. However, in the case where image capturing parameters are adjusted by the manual operation, it is unclear to a user how to adjust each image capturing parameter in order to bring the noise amount of a captured image to the noise amount that is targeted.

Figure 21:
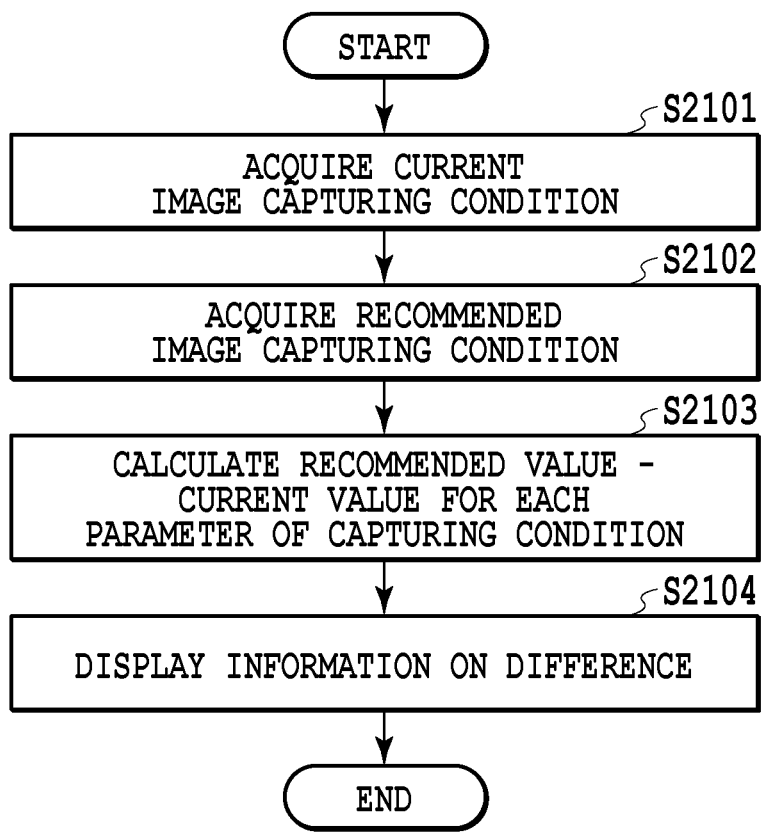
FIG. 21 is a flowchart showing the flow of steps of the processing performed by a display control unit according to a sixth embodiment.

Consequently, in the present embodiment, there is provided an image capturing apparatus capable of presenting the adjustment direction of the image capturing parameter in order to approach the noise amount that is targeted in the captured image. In the present embodiment, the configuration of the image capturing apparatus and the configuration of the function implemented by the control unit of the image capturing apparatus are the same as those in the fifth embodiment, and therefore, an explanation thereof is omitted (see FIG. 1 and FIG. 18). In the present embodiment, the display control unit 1801 performs display control based on the result by the image capturing parameter determination unit 202. Hereinafter, processing performed by the display control unit 1801 in the present embodiment is explained by using a flowchart in FIG. 21.

First, at step S2101, the display control unit 1801 acquires the current image capturing parameters (i.e., the current ISO speed, the current f-stop (F-number), and the current shutter speed) as the current image capturing parameters currently set to the image capturing apparatus.

Next, at step S2102, the display control unit 1801 acquires the recommended image capturing condition from the image capturing parameter determination unit 202.

Next, at step S2103, the display control unit 1801 calculates a difference Δ between determined recommended image capturing condition and the current image capturing condition for each parameter of the recommended image capturing condition by using expressions (11) to (13) below.

$$\Delta ISO = \text{(the ISO speed of the recommended image capturing condition)} - \text{(the current ISO speed)} \quad (11)$$

$$\Delta F = \text{(the } F\text{-number of the recommended image capturing condition)} - \text{(the current } F\text{-number)} \quad (12)$$

$$\Delta \text{shutter speed} = \text{(the shutter speed of the recommended image capturing condition)} - \text{(the current shutter speed)} \quad (13)$$

Figure 22:
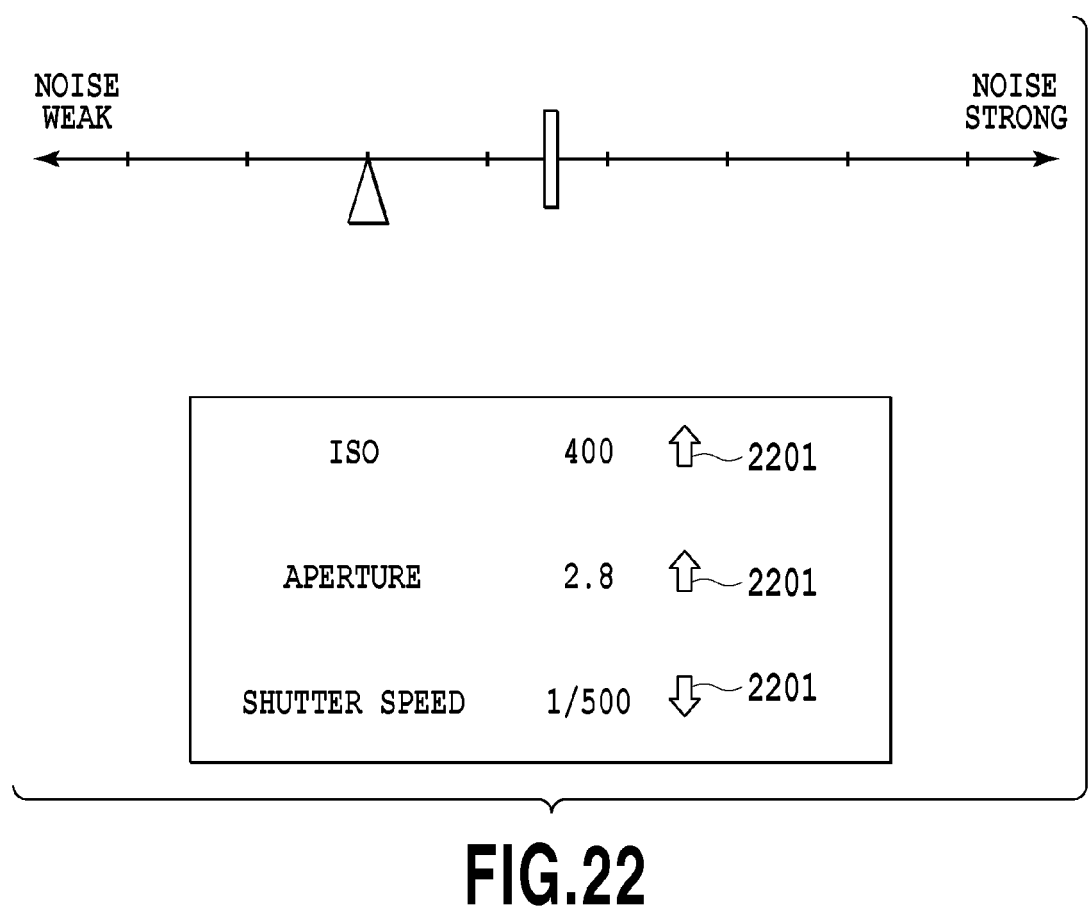
FIG. 22 is an example of a screen displayed by the display control unit according to the sixth embodiment.

Finally, at step S2104, the display control unit 1801 displays information on the difference value calculated at step S2103 on the display 110. An example of this display is shown in FIG. 22. In FIG. 22, an arrow 2201 indicates the adjustment direction of the image capturing parameter. The adjustment direction of the image capturing parameter is a direction in which the image capturing parameter should be adjusted in order to acquire an image with the noise amount that is targeted. In the present embodiment, the adjustment direction is indicated by the arrow, but the present invention is not limited to this. For example, it may also be possible to represent the adjustment direction by a color or to display the next image capturing condition in order to bring the noise amount closer to the target value.

As above, according to the present embodiment, it is made clear how to adjust the image capturing parameter in order to implement the noise amount desired by a user, and therefore, it is made possible for a user to easily adjust the image capturing parameter.

Seventh Embodiment

Figure 23:
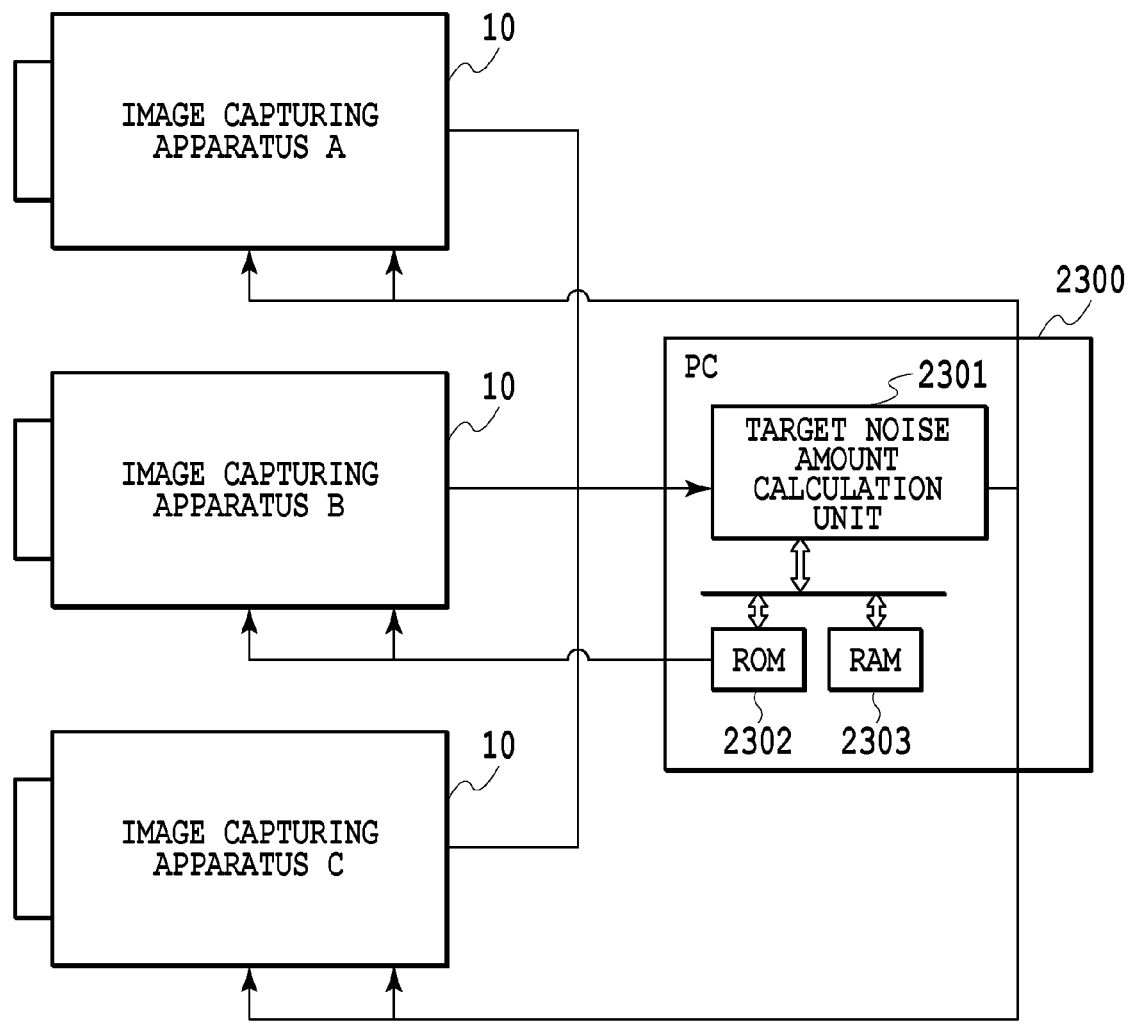
FIG. 23 is a conceptual diagram of an image capturing system according to a seventh embodiment.

In the first to sixth embodiments, the mechanism in which image capturing is performed under the image capturing condition that can implement the target noise amount specified by a user is described. However, in the case where a plurality of image capturing apparatuses are used simultaneously as shown in FIG. 23, by the method according to the first to sixth embodiment, it is necessary for a user to set an image capturing condition for each image capturing apparatus in order to capture images with about the same noise amount by all the image capturing apparatuses. The reason is that the range that can be taken by the noise amount in the captured image is different for each image capturing apparatus.

Consequently, in the present embodiment, there is provided an apparatus in which all image capturing apparatuses are capable of capturing images with about the same noise amount. In the present embodiment, first, the range that can be taken by the noise amount, which is the evaluation value common between the image capturing apparatuses, in each image capturing apparatus is found.

Figure 34:
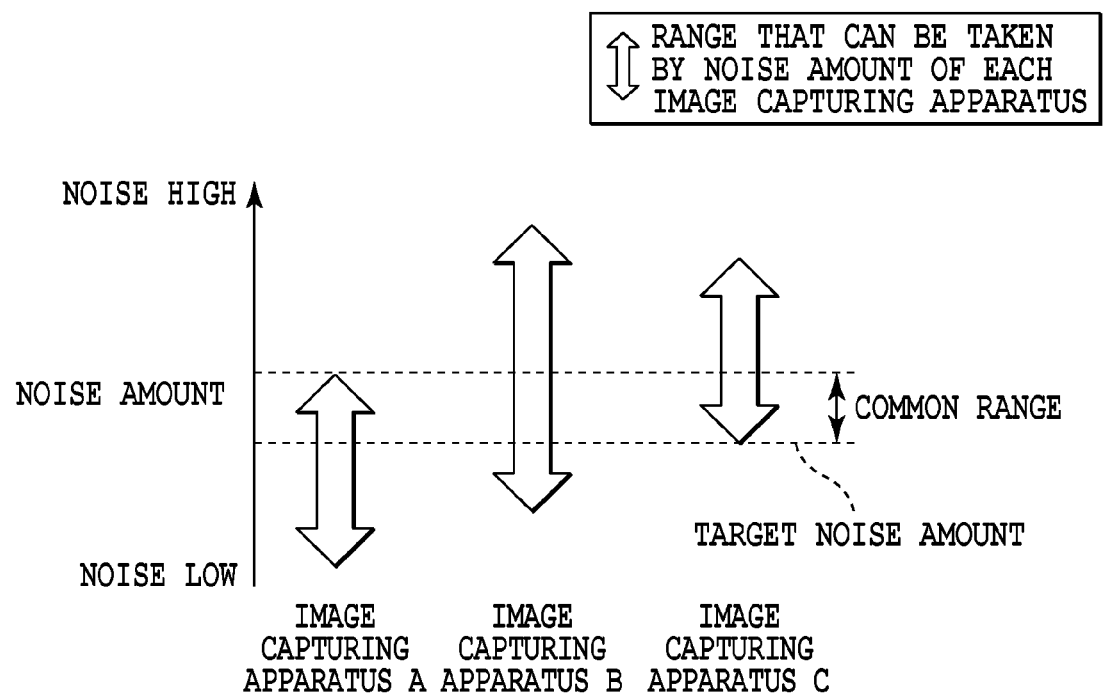
FIG. 34 is a diagram for illustrating the range that can be taken by the noise amount different for different image capturing apparatuses according to the seventh embodiment.

An outline of the present embodiment is explained by using image capturing apparatuses A, B, and C having different ranges that can be taken by the noise amount as shown in FIG. 34 as an example. First, from the ranges that can be taken by the noise amount of the respective image capturing apparatuses A, B, and C, the range common between all the image capturing apparatuses is found. Next, from the common range, the target noise amount is determined, which is the target value with which the noise amounts of all the image capturing apparatuses will be about the same. By setting the image capturing parameters of the image capturing apparatuses A, B, and C based on the target noise amount, the noise amounts of all the image capturing apparatuses are made about the same.

<Configuration of the Entire System>

FIG. 23 is a conceptual diagram showing a system including a plurality of image capturing apparatuses and an information processing apparatus (PC) for calculating the target noise amount according to the present embodiment. In the present embodiment, it is assumed that the configuration of the image capturing apparatus 10 is the same as that in the first embodiment (see FIG. 1). A PC 2300 includes a target noise amount calculation unit 2301 configured to control the aperture, the exposure time (shutter speed), the ISO speed, etc., based on information sent from the image capturing apparatus 10, a ROM 2302, and a RAM 2303. Image quality control processing performed by the image capturing apparatus 10 and target noise amount calculation processing performed by the PC 2300 will be described later.

<Image Quality Control Processing Performed by (CPU of) Image Capturing Apparatus>

Figure 24:
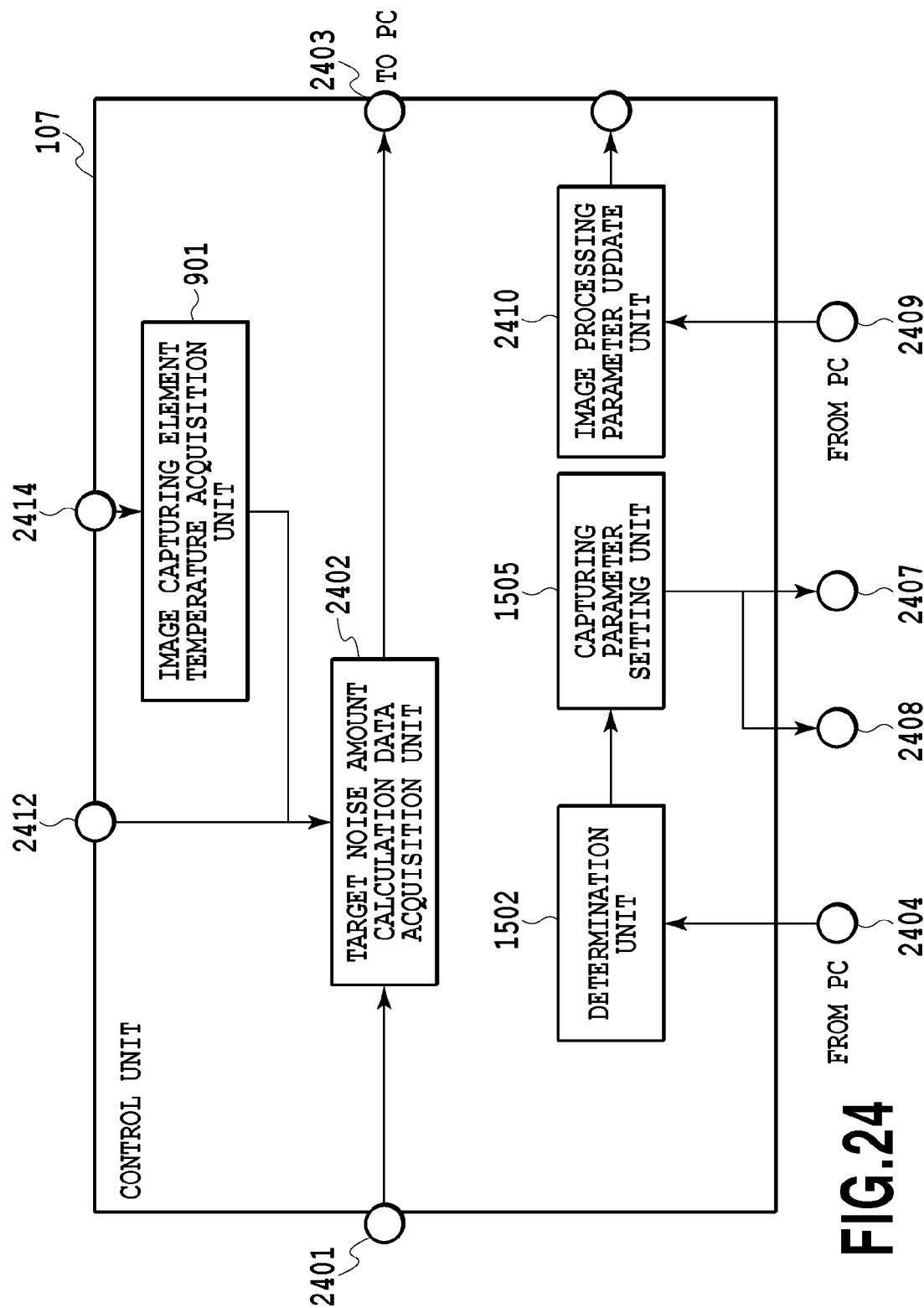
FIG. 24 is a block diagram showing the configuration of a function implemented by a control unit of an image capturing apparatus according to the seventh embodiment.

FIG. 24 is a block diagram showing the configuration of a function implemented by the control unit 107 included in the image capturing apparatus 10 according to the present embodiment. With reference to FIG. 24, the configuration of the function of the control unit 107 according to the present embodiment is explained along the flow of the processing in the control unit 107.

From a terminal 2401, a digital image (hereinafter, called an input image) having been subjected to processing in the image processing circuit 105 is input. From a terminal 2412, information on the aperture, the exposure time, and the ISO speed of the optical unit 101 is input. From a terminal 2414, sensor temperature information indicative of the current degrees Celsius of the temperature sensor 115 is input. The image capturing element temperature acquisition unit 901 acquires the sensor temperature information and sends the information to a target noise amount calculation data acquisition unit 2402.

The target noise amount calculation data acquisition unit 2402 acquires data necessary to determine the range of the noise amount unique to each image capturing apparatus 10 and transmits the data to the PC 2300 through a terminal 2403. Noise amount determination data acquisition processing will be described later. From a terminal 2404, the target noise amount transmitted from the PC 2300 is input through the input/output I/F 113.

The determination unit 1502 receives the target noise amount transmitted from the PC 2300 and determines image capturing conditions based on the target noise amount. The specific processing is the same as that in the first embodiment, and therefore, explanation is omitted (see S502 in FIG. 5).

The image capturing parameter setting unit 1505 controls the image capturing apparatus based on the image capturing condition for obtaining a captured image with the target noise amount. From a terminal 2407, the image capturing condition determined by the determination unit 1502 is output to the optical unit 101. From a terminal 2408, the image capturing condition determined by the determination unit 1502 is output to the image processing circuit 105. From a terminal 2409, the image processing parameters transmitted from the PC 2300 are input.

An image processing parameter update unit 2410 receives the image processing parameters and updates the image processing parameters of the image processing circuit 105.

<Processing to Acquire Data for Target Noise Amount Calculation>

Figure 25:
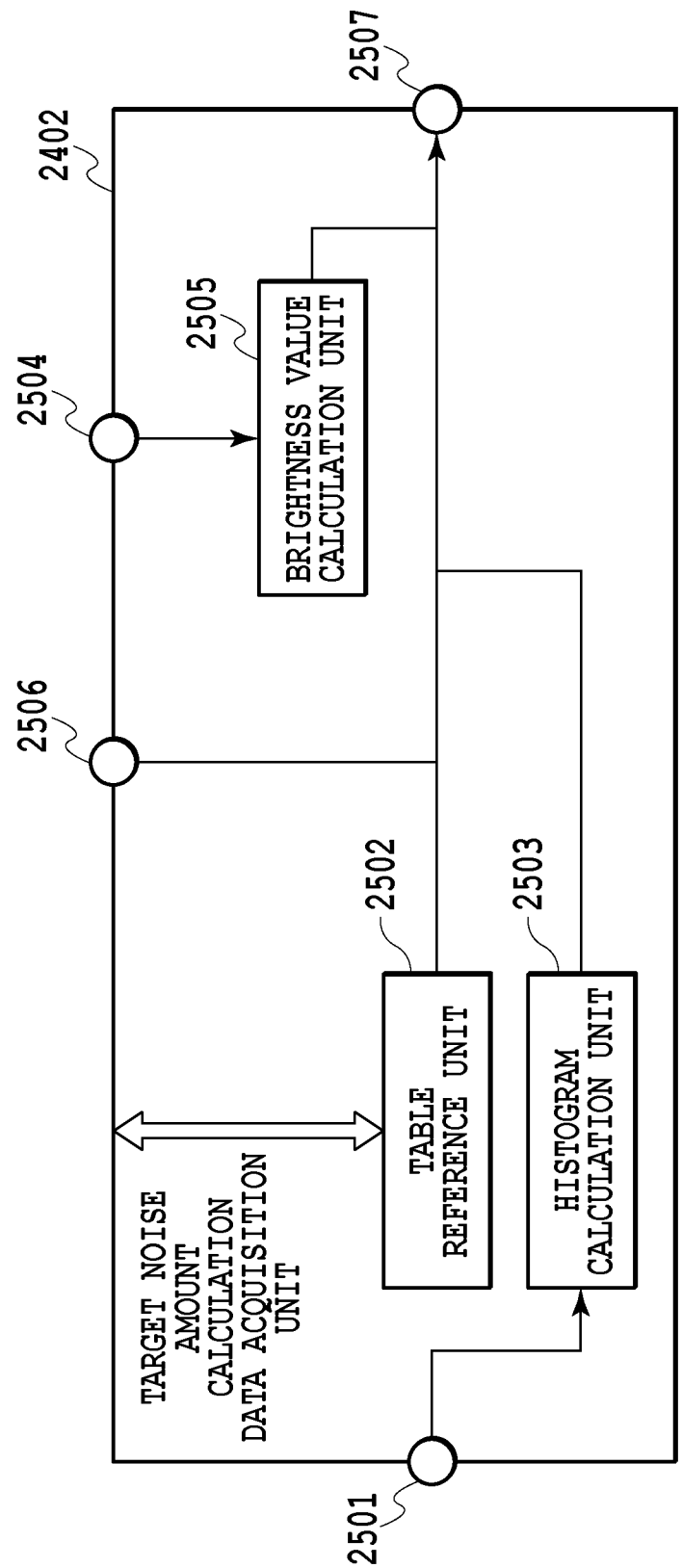
FIG. 25 is a block diagram showing the configuration of a function of a target noise amount calculation data acquisition unit according to the seventh embodiment.

FIG. 25 is a block diagram showing a configuration of the target noise amount calculation data acquisition unit 2402. Hereinafter, the target noise amount calculation data acquisition processing performed by the target noise amount calculation data acquisition unit 2402 is explained by using FIG. 25. Via a terminal 2501, the input image having been subjected to processing in the image processing circuit 105 is acquired.

Next, a table reference unit 2502 acquires a table T1 indicating the relationship between the brightness value of the image capturing apparatus 10 and the noise amount range corresponding to the brightness value from a ROM, not shown. Here, the brightness value is a value calculated from the f-stop, the exposure time, and the ISO speed. Further, in the table T1, the range that can be taken by the noise amount at the time of image capturing a subject having a certain brightness value with a variety of the apertures, the exposure times, and the ISO speeds and the brightness value are related to each other. An example of the table T1 is shown in FIG. 26. The table reference unit 2502 stores the acquired table T1 in a RAM, not shown.

Next, a histogram calculation unit 2503 calculates a histogram based on the pixel values of the input image. This is explained specifically. First, in the case where the input image has RGB values, the RGB values are normalized into values between 0 and 1 and then are converted into YUV signal values by using expressions below.

$$Y = 0.299R + 0.587G + 0.114B \quad (14)$$

$$U = -0.169R - 0.3316G + 0.500B \quad (15)$$

$$V = 0.500R - 0.4186G - 0.0813B \quad (16)$$

Then, the Y signal values are classified into values between 0 and 1 at intervals of 0.01 and a histogram of the Y signal value in all the pixels of the input image is calculated. Then, the calculated histogram is stored in a RAM, not shown.

Next, a brightness value calculation unit 2505 acquires information on the aperture, the exposure time, and the ISO speed of the optical unit 101 via a terminal 2504 and calculates the brightness value of the subject based on the information. Specifically, by expression (17) and expression (18) based on the APEX standards used as the digital camera image format standards of the Japanese Industrial Standards, the value corresponding to a brightness signal value of 0.18 at the time of normalizing the brightness signal values into values between 0 and 1 is calculated as a brightness value B.

$$B = 3.42 \times 2^p \quad (17)$$

$$p = 2\log_2 F + \log_2 T + \log_2 \frac{S}{3.125} \quad (18)$$

Here, the unit of the brightness value is [cd/m²], F is the f-stop, T is the exposure time [sec], and S is the ISO speed.

Next, from a terminal 2506, sensor temperature information indicative of the current degrees Celsius transmitted from the temperature sensor 115 is acquired and then is stored in the RAM. Next, from a terminal 2507, the table T1, the histogram, the brightness value B, and the sensor temperature information stored in the RAM are transmitted to the target noise amount calculation unit 2301 of the PC 2300 as target noise amount calculation data through the input/output I/F 113.

In the embodiment described above, in the brightness value calculation unit 2505, the brightness value B is calculated from the aperture, the exposure time, and the ISO speed, but the calculation method of the brightness value is not limited to this, and a method for acquiring the photometric value from the exposure meter within the image capturing apparatus may be used.

<Target Noise Amount Calculation Processing>

Figure 27:
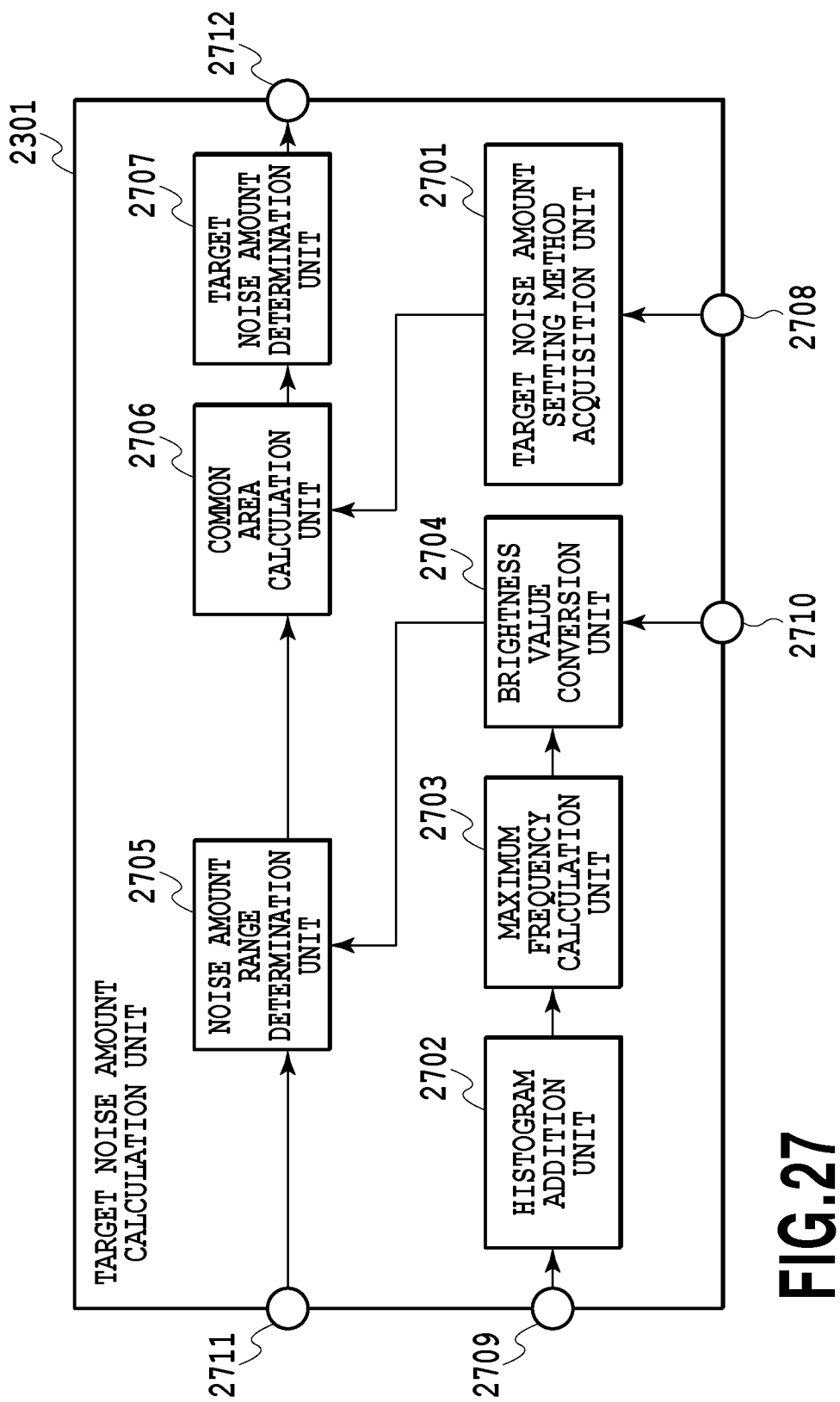
FIG. 27 is a block diagram showing the configuration of a function of a target noise amount calculation unit according to the seventh embodiment.

FIG. 27 is a block diagram showing the configuration of a function of the target noise amount calculation unit 2301. The target noise amount calculation processing is performed after the PC 2300 receives the target noise amount calculation data transmitted from all the image capturing apparatuses within the system. The target noise amount calculation unit 2301 stores the table T1, the histogram, the brightness value B, and the sensor temperature information that are received in the RAM 2303, and reads the target noise amount calculation program from the ROM 2302 and executes the program. Hereinafter, the target noise amount calculation processing is explained by using FIG. 27.

A target noise amount setting method acquisition unit 2701 acquires the setting method of the target noise amount input by a user operating the GUI of the PC 2300. In the following, an explanation is given by using the minimum value setting that uses the minimum value, the average value setting that uses an average value, etc., as an example of the setting method of the target noise amount, but the setting method of the target noise amount is not limited to those. Further, it may also be possible to use a method specified in advance in the PC 2300 as the setting method of the target noise amount in place of the method set by a user.

A histogram addition unit 2702 acquires the histograms of all the image capturing apparatuses that the target noise amount calculation unit 2301 has received through a terminal 2709. The histogram addition unit 2702 calculates an added histogram in which all the histograms are added by adding the acquired histograms. The specific histogram addition processing will be described later.

A maximum frequency calculation unit 2703 calculates the Y signal component whose frequency is the highest in the captured images of all the image capturing apparatuses as a mode by using the added histogram calculated by the histogram addition unit 2702. Specifically, the mode is calculated by expression (19) below.

$$Y_m = h^{-1}(\max(Hc(Y_n))) \quad (19)$$

Here, Yn is a discrete value of the Y signal values classified into values between 0 and 1 at intervals of 0.01, Hc (Yn) is a frequency of each Y signal value of the added histogram, $h^{-1}$ (m) is a function representing the Y signal value corresponding to the mode m, and Ym is the Y signal value of the mode.

A brightness value conversion unit 2704 acquires the brightness value B from a terminal 2710. Then, the brightness value conversion unit 2704 calculates the brightness value corresponding to the mode calculated by the maximum frequency calculation unit 2703 by using the acquired brightness value B. The conversion processing into the brightness value corresponding to the mode will be described later.

A noise amount range determination unit 2705 acquires the table in which the range of the noise amount of each image capturing apparatus and the brightness value are associated and the sensor temperature information of each image capturing apparatus from a terminal 2711. Then, the noise amount range determination unit 2705 determines the range of the noise amount at the brightness value corresponding to the mode for each image capturing apparatus by using the table, the sensor temperature information, and the brightness value corresponding to the mode. The processing to determine the range of the noise amount will be described later.

A common area calculation unit 2706 calculates a common range of the noise amount common to all the image capturing apparatuses from the range of the noise amount of each image capturing apparatus. In the case where it is assumed that the range of the noise amount of a certain image capturing apparatus i is between Emin (i) and Emax (i), it is possible to calculate the minimum value and the maximum value of the common range from expression (20) and expression (21) below.

$$Ec_{min} = \max(E\min(0), E\min(1), E\min(2), \ldots, E\min(i), \ldots) \quad (20)$$

$$Ec_{max} = \min(E\max(0), E\max(1), E\max(2), \ldots, E\max(i), \ldots) \quad (21)$$

Here, $Ec_{min}$ is the minimum value of the common range and $Ec_{max}$ is the maximum value of the common range.

A target noise amount determination unit 2707 sets a target noise amount from the common range of the noise amount based on the target noise amount setting method that is set. For example, in the case where the target noise amount setting method is the minimum value setting that uses the minimum value, a target noise amount Ed is set to the minimum value of the common range of the noise amount. Further, in the case where the target noise amount setting method is the average value setting that uses the average value, the target noise amount Ed is set to the average value of the common range of the noise amount. After the set target noise amount Ed is transmitted to each image capturing apparatus through a terminal 2712, the target noise amount calculation program is exited.

<Histogram Addition Processing>

Figure 28:
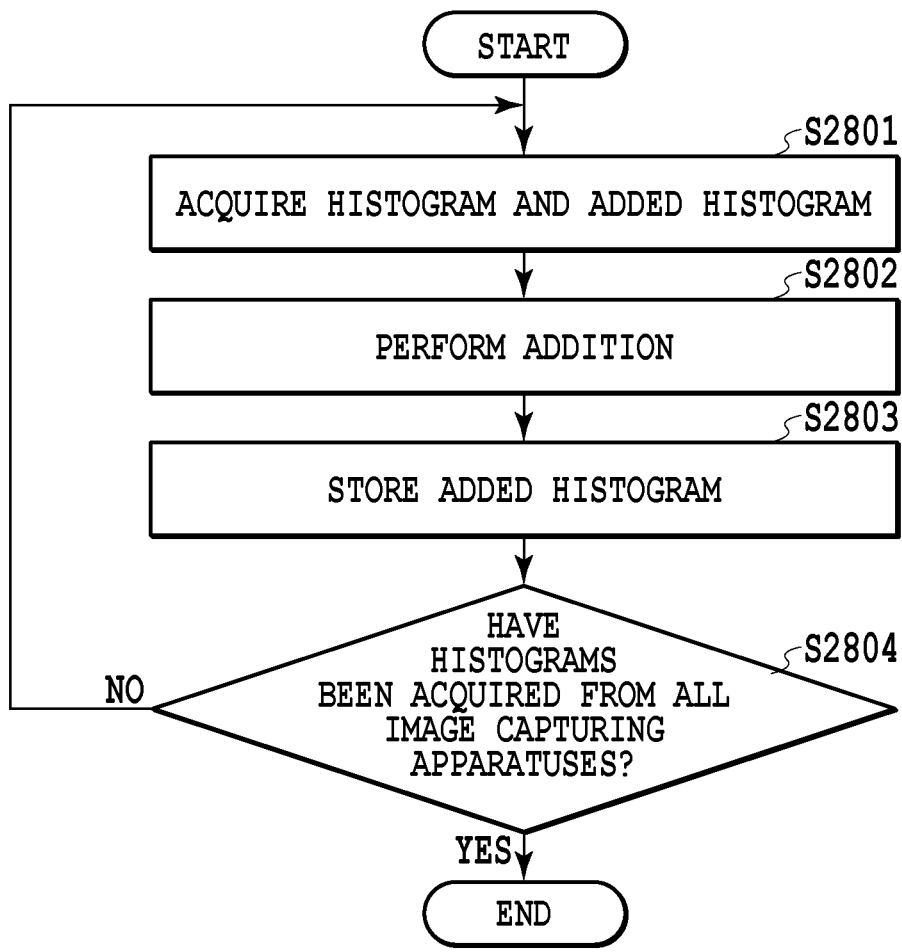
FIG. 28 is a flowchart showing the flow of the steps of histogram addition processing according to the seventh embodiment.

FIG. 28 is a flowchart showing the flow of the steps of the histogram addition processing performed by the histogram addition unit 2702. Hereinafter, the histogram addition processing is explained by using FIG. 28.

At step S2801, the histogram addition unit 2702 acquires the histogram of the image capturing apparatus and the added histogram for accumulation by reading from the RAM 2303. Next, the processing proceeds to step S2802.

At step S2802, the histogram addition unit 2702 adds the added histogram and the histogram of the image capturing apparatus. Addition is performed in accordance with expression (22) below.

$$Hc(Y_n) = Hc(Y_n) + H(Y_n) \quad (22)$$

Here, H (Yn) is the frequency in the case where the Y signal value is Yn and Hc (Yn) is the added frequency in the case where the Y signal value is Yn. In other words, in the expression (22), the frequency is added for each group of the Y signal value. Next, the processing proceeds to step S2803.

At step S2803, the histogram addition unit 2702 stores the added histogram Hc in the RAM 2303. Next, the processing proceeds to step S2804.

At step S2804, the histogram addition unit 2702 determines whether the processing at steps S2801 to S2803 has been performed for the histograms of all the image capturing apparatuses. In the case where it is determined that the processing has been performed for the histograms of all the image capturing apparatuses, the histogram addition processing is exited, and in other cases, the processing returns to step S2801 and the addition processing for the histogram of the next image capturing apparatus is performed.

<Conversion Processing from Mode into Brightness Value>

Figure 29:
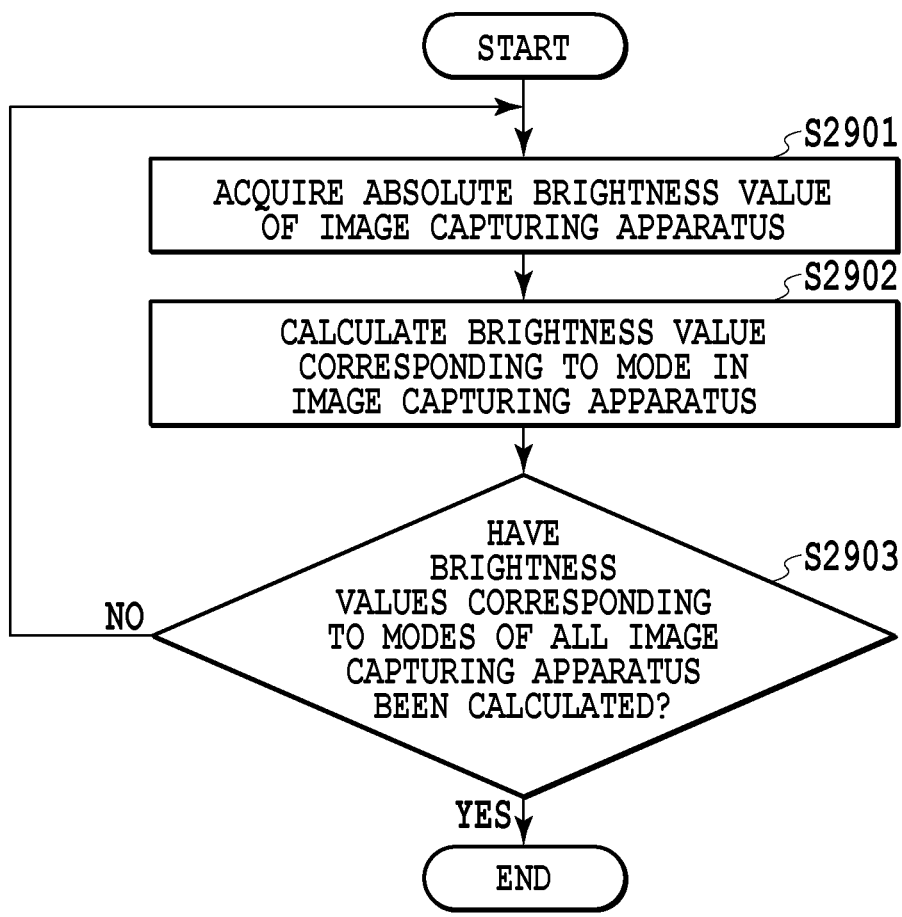
FIG. 29 is a flowchart showing the flow of the steps of conversion processing from the mode into the brightness value according to the seventh embodiment.

FIG. 29 is a flowchart showing a flow of the conversion processing from the mode into the brightness value performed by the brightness value conversion unit 2704. Hereinafter, the conversion processing from the mode into the brightness value is explained by using FIG. 29.

At step S2901, the brightness value conversion unit 2704 acquires the brightness value B transmitted from a certain image capturing apparatus i. Next, the processing proceeds to step S2902.

At step S2902, the brightness value conversion unit 2704 calculates the brightness value Bi corresponding to the mode Ym from the mode Ym and the brightness value B. Here, the brightness value B is the brightness value corresponding to the value equivalent to a brightness signal value of 0.18 at the time of normalizing the brightness signal values into values between 0 and 1, and the Y signal and the brightness value are in the linear relationship, and therefore, the brightness value B is the brightness value in the case where Y=0.18. Consequently, the brightness value Bi corresponding to the mode in the image capturing apparatus i is found from expression (23) below.

$$B_i = \frac{B \cdot Y_m}{0.18} \quad (23)$$

At step S2903, the brightness value conversion unit 2704 determines whether the brightness value Bi corresponding to the mode has been calculated for all the image capturing apparatuses. In the case where it is determined that the brightness value Bi has been calculated for all the image capturing apparatuses, the conversion processing from the mode into the brightness value is exited, and in other cases, the processing returns to step S2901 and the conversion processing from the mode into the brightness value for the next image capturing apparatus is performed.

<Noise Amount Range Determination Processing>

Figure 30:
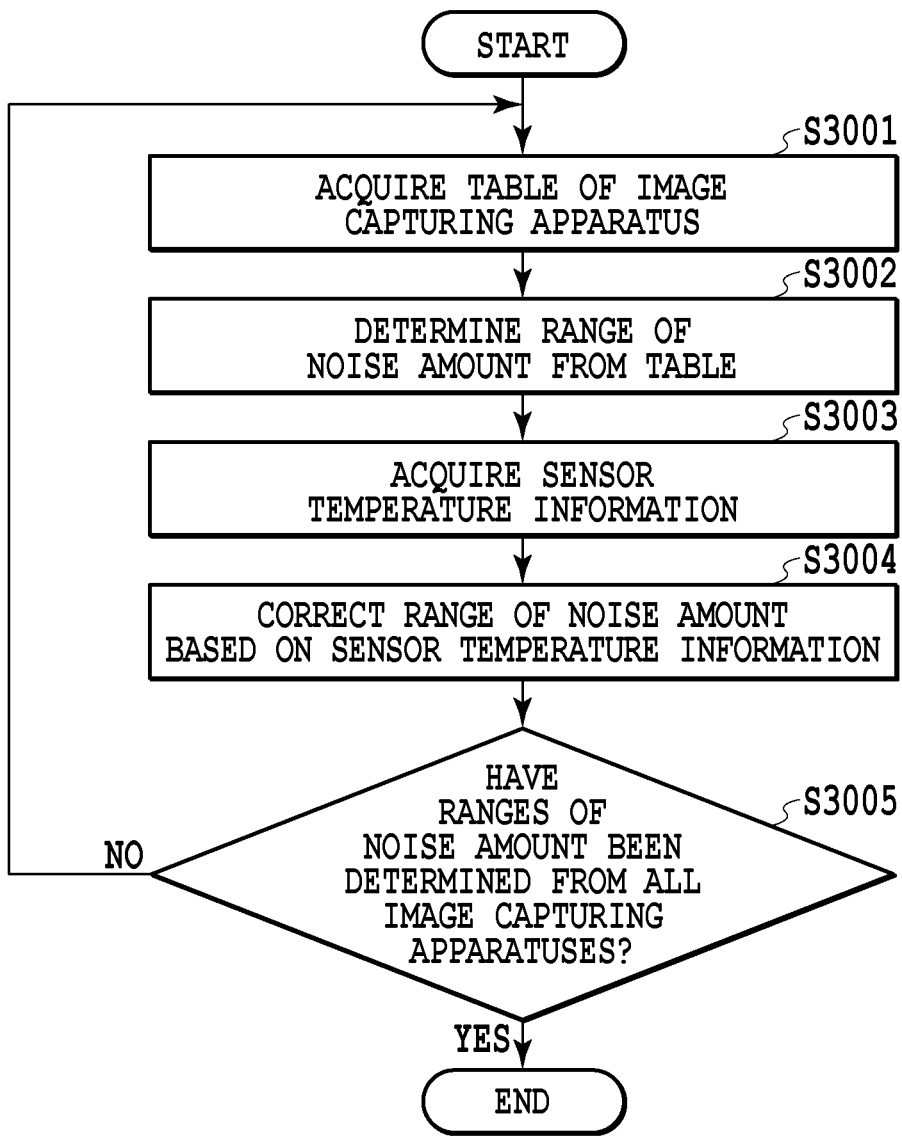
FIG. 30 is a flowchart showing the flow of the steps of noise amount range determination processing according to the seventh embodiment.

FIG. 30 is a flowchart showing the flow of the steps of the noise amount range determination processing performed by the noise amount range determination unit 2705. Hereinafter, the noise amount range determination processing is explained by using FIG. 30.

At step S3001, the noise amount range determination unit 2705 acquires the table T1 of the image capturing apparatus i. Next, the processing proceeds to step S3002.

At step S3002, the noise amount range determination unit 2705 determines the range of the noise amount from the brightness value Bi corresponding to the mode and the table T1. Specifically, it is only required to search for the brightness value that agrees with Bi from the brightness values of the table T1 and to determine the noise amount range corresponding to the brightness value that agrees with Bi. In the case where the relevant brightness value is not searched for as the result of searching the table T1, it may also be possible to determine the noise amount range corresponding to the brightness value smaller than and closest to the brightness value Bi corresponding to the mode and the noise amount range corresponding to the brightness value larger than and closest to the brightness value Bi, and then to determine the noise amount range of the brightness value Bi corresponding to the mode by interpolating the noise amount ranges. Next, the processing proceeds to step S3003.

At step S3003, the noise amount range determination unit 2705 acquires the sensor temperature information transmitted from the image capturing apparatus. Next, the processing proceeds to step S3004.

At step S3004, the noise amount range determination unit 2705 corrects the noise amount range by taking into consideration the sensor temperature information. The correction of the noise amount range is performed by using the expression (7) described above in the third embodiment. Next, the processing proceeds to step S3005.

At step S3005, the noise amount range determination unit 2705 determines whether the noise amount range determination processing has been performed for all the image capturing apparatuses. In the case where it is determined that the noise amount range determination processing has been performed for all the image capturing apparatuses, the noise amount range determination processing is exited, and in other cases, the processing returns to step S3001 and the noise amount range determination processing for the next image capturing apparatus is performed.

As described above, in the present embodiment, in the image capturing system including a plurality of image capturing apparatuses, the range that can be taken by the noise amount is calculated for each image capturing apparatus from the image capturing conditions of the image capturing apparatus and the noise amount common between the image capturing apparatuses is calculated from the range that can be taken by the noise amount of each image capturing apparatus. Then, based on the common noise amount, the target noise amount is calculated and the image capturing apparatus is controlled based on the calculated target noise amount. Because of this, it is possible to make uniform the image quality of all the image capturing apparatuses.

Eighth Embodiment

In the seventh embodiment, the case is explained where the range common to all the image capturing apparatuses is found from the noise amount range each image capturing apparatus can take. However, there is a case where the common range that can be taken by the noise amount is not found depending on the combination of image capturing apparatuses (e.g., the case as in FIG. 35), such as in the case where image capturing apparatuses of different models are used, and therefore, by the method in the seventh embodiment, there is such a problem that it is not possible to calculate the target noise amount in this case.

Consequently, in the present embodiment, a method for determining the target noise amount in the case where there is no noise amount range common to all image capturing apparatuses is described.

Figure 35:
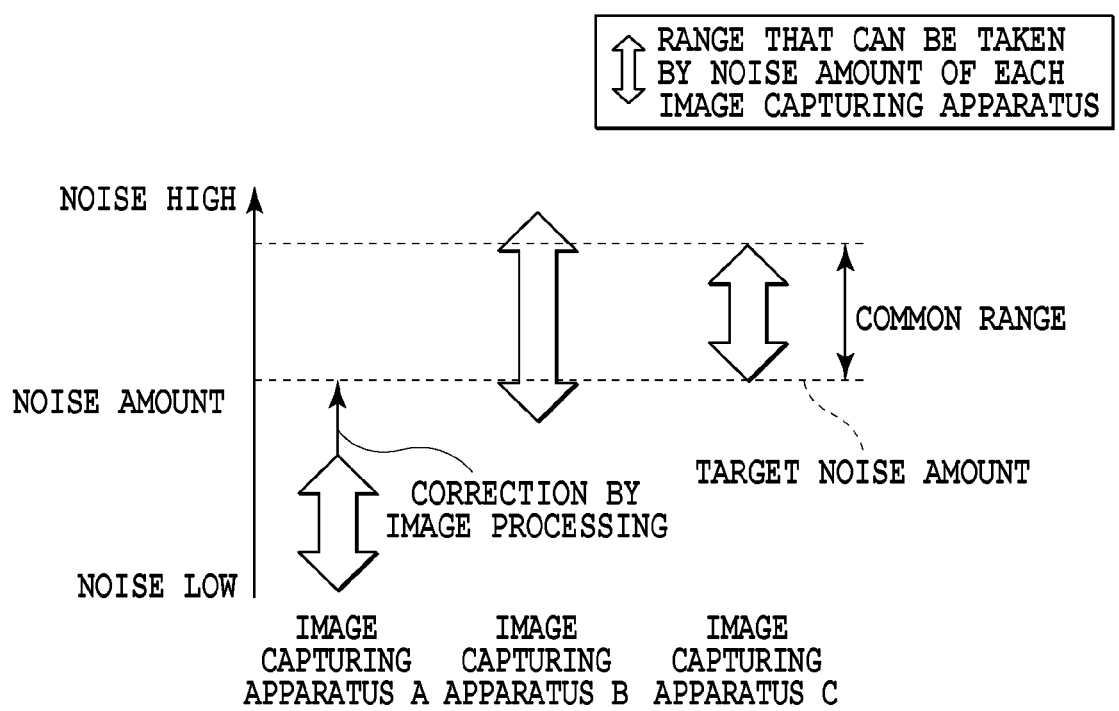
FIG. 35 is a diagram for illustrating the range that can be taken by the noise amount different for different image capturing apparatuses according to the eighth embodiment.

An outline of the present embodiment is explained by using the case shown in FIG. 35 as an example. First, the target noise amount is determined based on the noise amount ranges that the image capturing apparatuses B and C can take. For the image capturing apparatus A not having the common range, the image capturing condition is set, under which the range of the image capturing apparatus A becomes closest to the common range of the image capturing apparatuses B and C. Further, in order to bring the noise amount of the image capturing apparatus A to those of the image capturing apparatuses B and C, the image processing is applied. By the processing such as this, even in the case where there is no noise amount range common to all the image capturing apparatuses, it is possible to make about the same the noise amounts of the image capturing apparatuses. Hereinafter, the present embodiment is explained with the portions different from those in the seventh embodiment being focused on.

<Target Noise Amount Calculation Processing>

Figure 31:
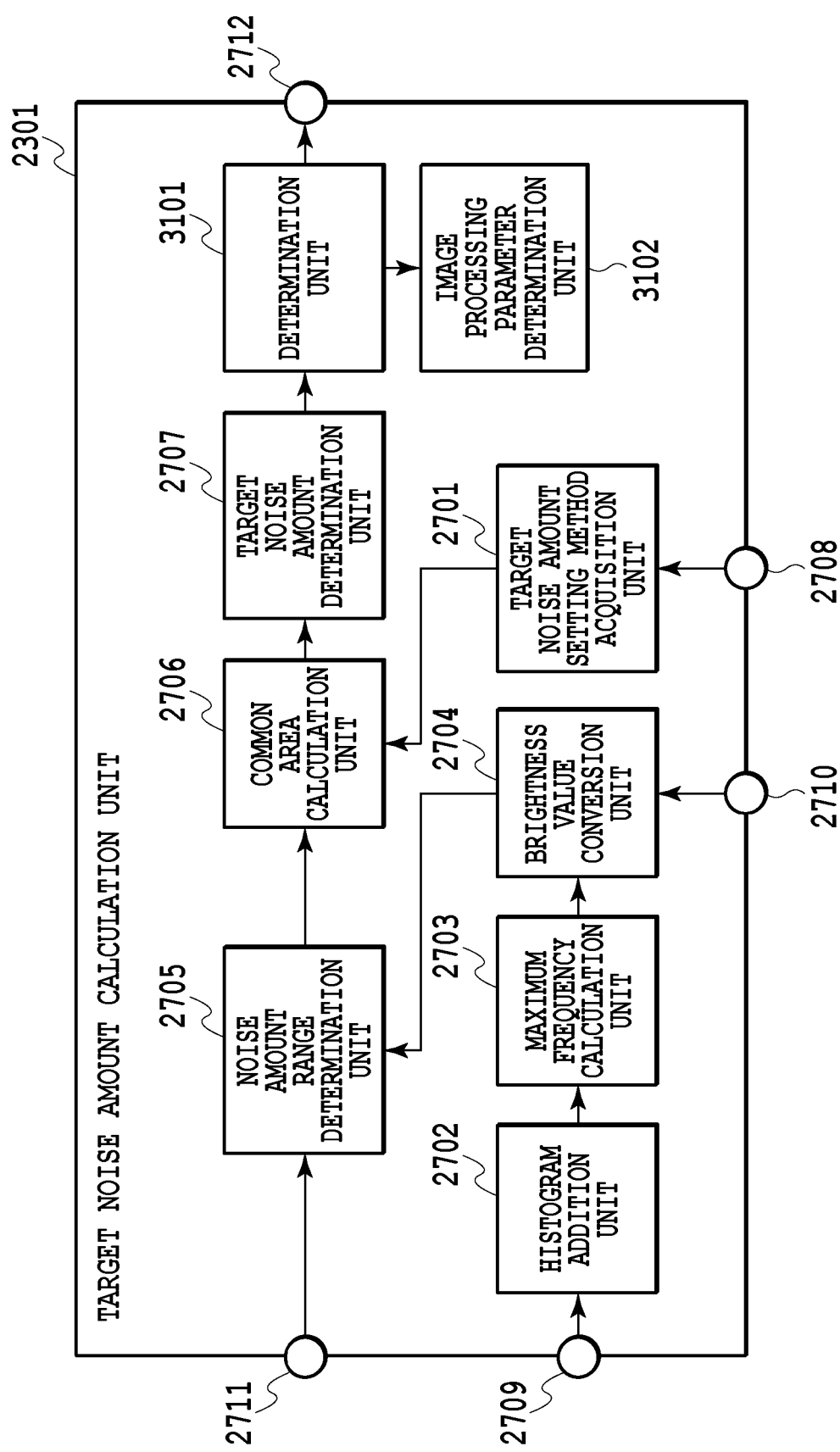
FIG. 31 is a block diagram showing the configuration of a function of a target noise amount calculation unit according to an eighth embodiment.

FIG. 31 is a block diagram showing a function configuration of the target noise amount calculation unit 2301. The target noise amount calculation unit 2301 is implemented by the CPU of the PC 2300. The target noise amount calculation unit 2301 stores the received target noise amount calculation data in the RAM 2303, reads the target noise amount calculation program from the ROM 2302, and executes the program. Hereinafter, the target noise amount calculation processing is explained by using FIG. 31.

The target noise amount setting method acquisition unit 2701, the histogram addition unit 2702, the maximum frequency calculation unit 2703, the brightness value conversion unit 2704, the noise amount range determination unit 2705, and the target noise amount determination unit 2707 in FIG. 31 are the same as those in the seventh embodiment, and therefore, an explanation thereof is omitted.

The common area calculation unit 2706 calculates the common range of the noise amount. The specific common range calculation processing will be described later.

A determination unit 3101 determines whether the set target noise amount is included within the ranges of the noise amount of all the image capturing apparatuses. Specifically, the determination unit 3101 determines whether or not the noise amount range removed at step S3306, to be described later, because of being beyond the common range is stored in the RAM 2303. In the case where it is determined that the noise amount range removed because of being beyond the common range is not stored in the RAM 2303, it is concluded that the target noise amount is within the noise amount ranges of all the image capturing apparatuses, and a target noise amount Ed is transmitted to each image capturing apparatus, and then the target noise amount calculation program is exited. In the case where it is determined that the noise amount range having been removed is stored in the RAM 2303, the processing to adjust the noise amount of the image capturing apparatus not having the common noise amount range to the target noise amount is performed in an image processing parameter determination unit 3102.

The image processing parameter determination unit 3102 calculates parameters related to the image processing (hereinafter, referred to as image processing parameters) which the image capturing apparatus whose noise amount Ed is beyond the noise amount range is caused to perform. By causing the image capturing apparatus to perform the image processing in accordance with the image processing parameters, the noise amount of the image capturing apparatus is caused to agree with the target noise amount. In specific processing of the image processing parameter determination processing, first, the noise amount range of the image capturing apparatus is read from the RAM 2303. Next, from the ROM 2302, an image processing parameter table T2 indicating the correspondence relationship between the target noise amount and the image processing parameters corresponding to the noise amount is read. FIG. 32 shows an example of the image processing parameter table T2. In the table illustrated in FIG. 32, evaluation values of the noise amount are described in the column direction and evaluation values of the target noise amount are described in the row direction.

An explanation is given by using the case where the target noise amount is 0.1 and the noise amount is 0.2 as an example. In this case, in order to bring the noise amount close to the target noise amount, it is necessary to perform filter processing to reduce the noise. Here, by referring to the image processing parameter table T2, it is known that the filter coefficient of the relevant filter is k=[0.3, 0.4, 0.3]. Here, for simplification, the filter coefficient is represented as a one-dimensional one. The PC 2300 transmits the filter coefficient k as an image processing parameter to the image capturing apparatus having no common noise amount range. As another example, the case is explained where the target noise amount is 0.2 and the noise amount is 0.1. In this case, in order to bring the noise amount close to the target noise amount, it is necessary to add noise. Here, by referring to the image processing parameter table T2, it is necessary to perform random noise addition processing with a variance σ of 0.3. Consequently, the PC2300 transmits the variance of noise to be added as an image processing parameter to the image capturing apparatus having no common noise amount range.

By the above, it is possible to calculate the image processing parameter necessary to make uniform the image quality and to send the parameter to the image capturing apparatus having no common noise amount range.

<Common Range Calculation Processing>

Figure 33:
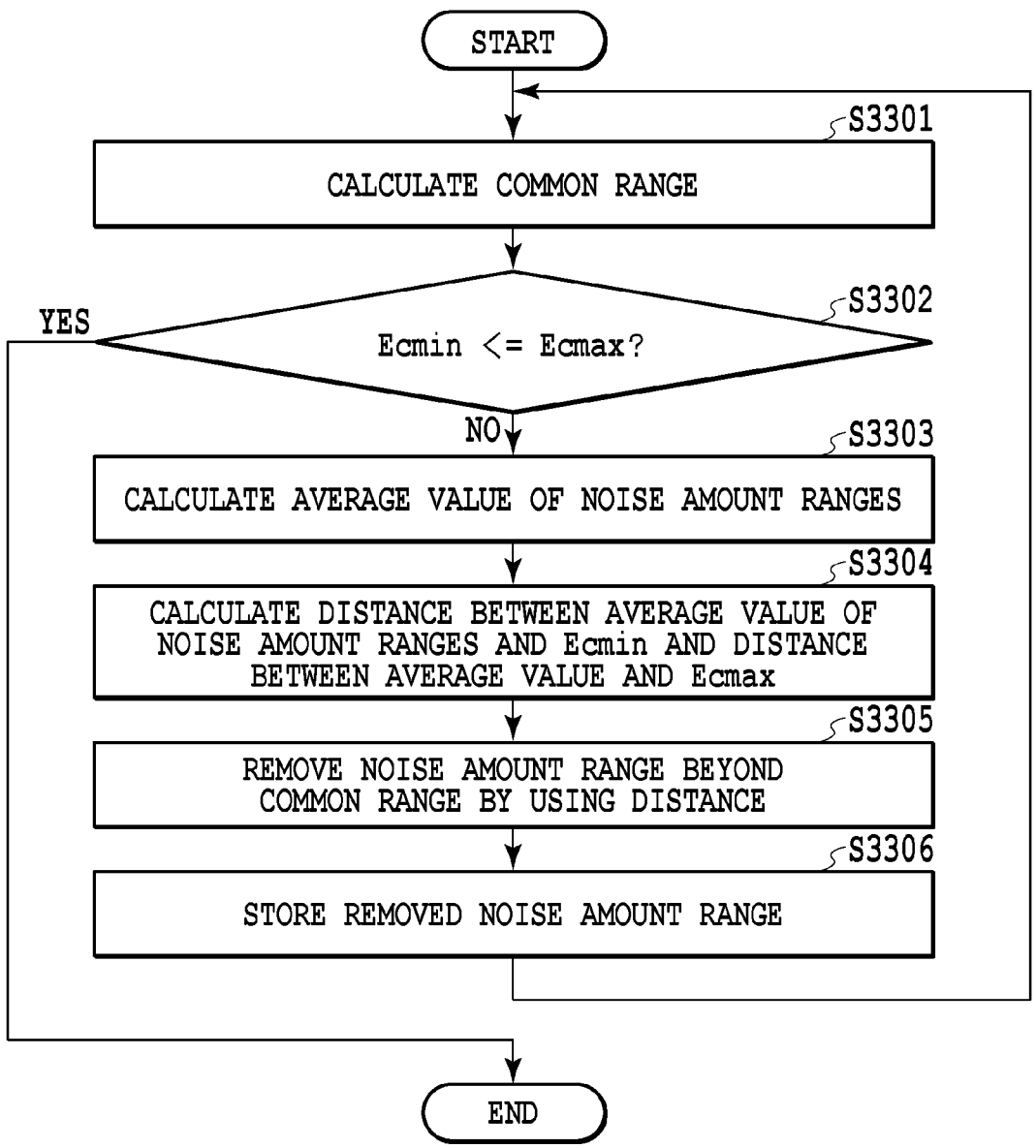
FIG. 33 is a flowchart showing the flow of the steps of common area calculation processing according to the eighth embodiment.

FIG. 33 is a flowchart showing the flow of the steps of the common range calculation processing performed by the common area calculation unit 2706. Hereinafter, the common range calculation processing is explained by using FIG. 33.

At step S3301, the common area calculation unit 2706 calculates the common range of the noise amount common to all the ranges of the noise amount from the range of the noise amount of each image capturing apparatus. The specific processing is the same as the processing in the common area calculation unit 2706 in the seventh embodiment, and therefore, explanation is omitted. In the present embodiment, as in the seventh embodiment, it is assumed that the minimum value of the common range of each image capturing apparatus for the noise amount is $Ec_{min}$ and the maximum value is $Ec_{max}$.

At step S3302, the common area calculation unit 2706 determines whether there is a noise amount range common to all the image capturing apparatuses by using expression (24) below. In the case where there is a noise amount range common to all the image capturing apparatuses, the expression (24) is satisfied.

$$EC_{min} \leq Ec_{max} \quad (24)$$

In the case where the expression (24) is satisfied, the common range is calculated as a common portion to all the image capturing apparatuses, and therefore, the common range calculation processing is exited. In the case where the expression (24) is not satisfied, the processing proceeds to step S3303.

At step S3303, the common area calculation unit 2706 calculates an average value Eave of the maximum values and the minimum values of all the noise amount ranges. Specifically, the average Eave is calculated by using expression (25) below.

$$E_{ave} = \frac{1}{2N} \sum_{i=0}^{N-1} (Emin(i) + Emax(i)) \quad (25)$$

Here, i is the index of each image capturing apparatus and Emin (i) and Emax (i) are the minimum value and the maximum value, respectively, of the noise amount range of the image capturing apparatus i. Next, the processing proceeds to step S3304.

At step S3304, the common area calculation unit 2706 calculates a distance between the average value Eave of the noise amount range and $Ec_{min}$ and a distance between the average value Eave and $Ec_{max}$ by using expression (26) and expression (27) below.

$$Dmin = |Ec_{min} - E_{ave}| \quad (26)$$

$$Dmax = |Ec_{max} - E_{ave}| \quad (27)$$

Next, the processing proceeds to step S3305.

At step S3305, the common area calculation unit 2706 searches for the image capturing apparatus having the noise amount range beyond the common range by using the distances Dmin and Dmax and the noise amount ranges of all the image capturing apparatuses and excludes the noise amount range from the target of the common range to be examined. Specifically, in the case where Dmin>Dmax, the noise amount range of the image capturing apparatus i having $Ec_{min}$ (i) is excluded. Further, in the case where Dmin≤Dmax, the noise amount range of the image capturing apparatus i having $Ec_{max}$ (i) is excluded. Next, the processing proceeds to step S3306.

At step S3306, the common area calculation unit 2706 stores the noise amount range of the image capturing apparatus excluded at step S3305 in the RAM 2303. Next, the processing returns to step S3301.

In the present embodiment, image processing parameters are set and transmitted to the image capturing apparatus i. Then, the control unit 107 of the image capturing apparatus i receives the image processing parameters. In the operation of the image quality control, the histogram addition unit 2702 updates the parameters so that the filter processing of the filter coefficient k acquired by the filter processing unit of the image processing circuit 105 is performed. Alternatively, the parameters are updated so that the image processing circuit 105 adds random noise with the variance σ.

As above, according to the present embodiment, also in the case where there is no common range of the noise amount among the image capturing apparatuses, it is possible to make uniform the image quality among all the image capturing apparatuses by additionally performing image processing.

Ninth Embodiment

In the seventh and eighth embodiments, the method for making uniform the noise amounts different from camera to camera is explained.

Figure 36:
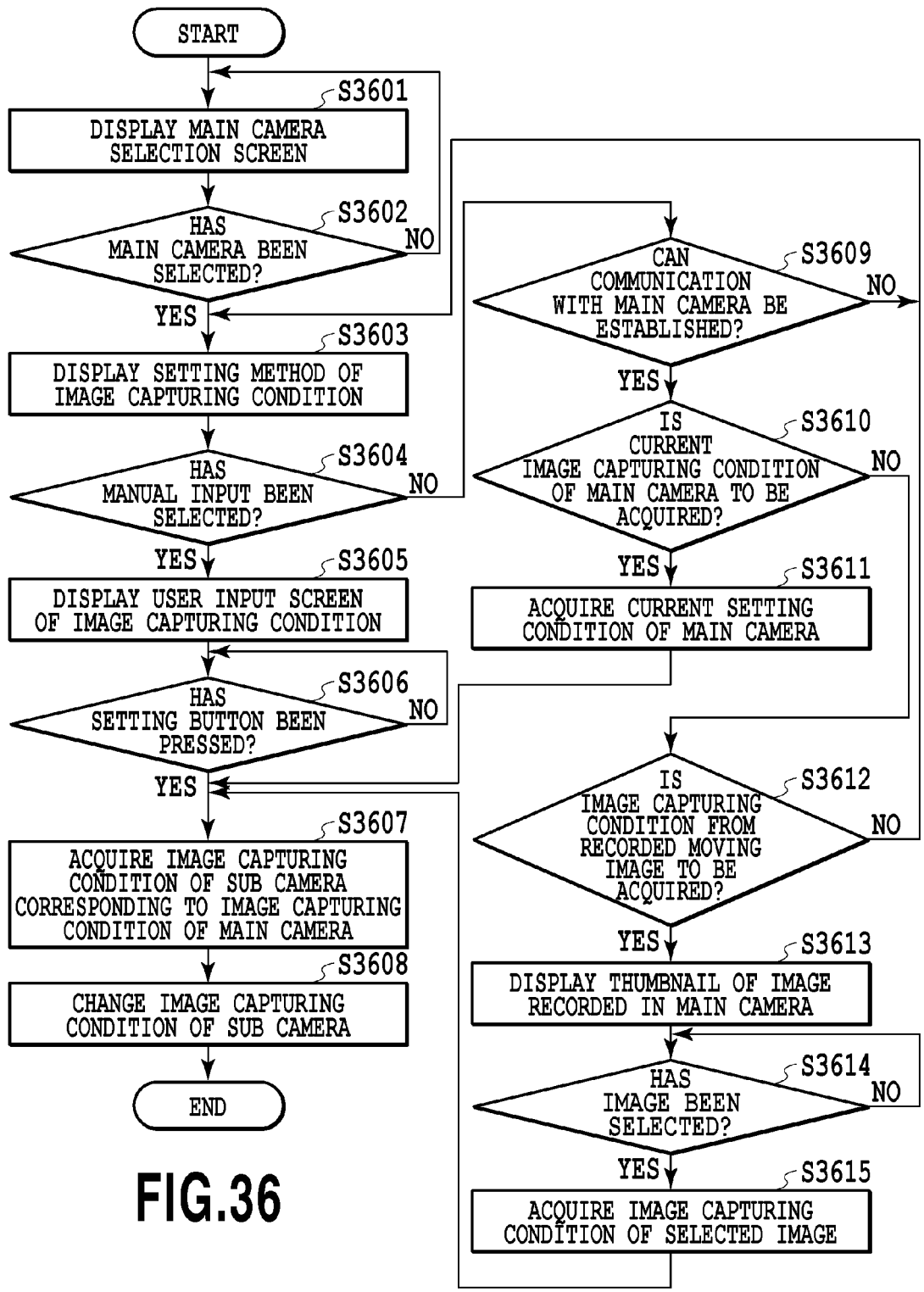
FIG. 36 is an operation flowchart of a sub camera according to a ninth embodiment.

In the present embodiment, in capturing by using a plurality of cameras including a main camera and a sub camera, a method for determining an image capturing condition of the sub camera under which the noise amount of the sub camera is the same as that of the main camera by setting the image capturing condition and the noise amount of the main camera on the sub camera side is explained. The camera configuration in the present embodiment is the same as that in the first to sixth embodiments, and therefore, explanation is omitted. Hereinafter, the operation of the sub camera in the present embodiment is explained by using a flowchart in FIG. 36.

Figure 37:
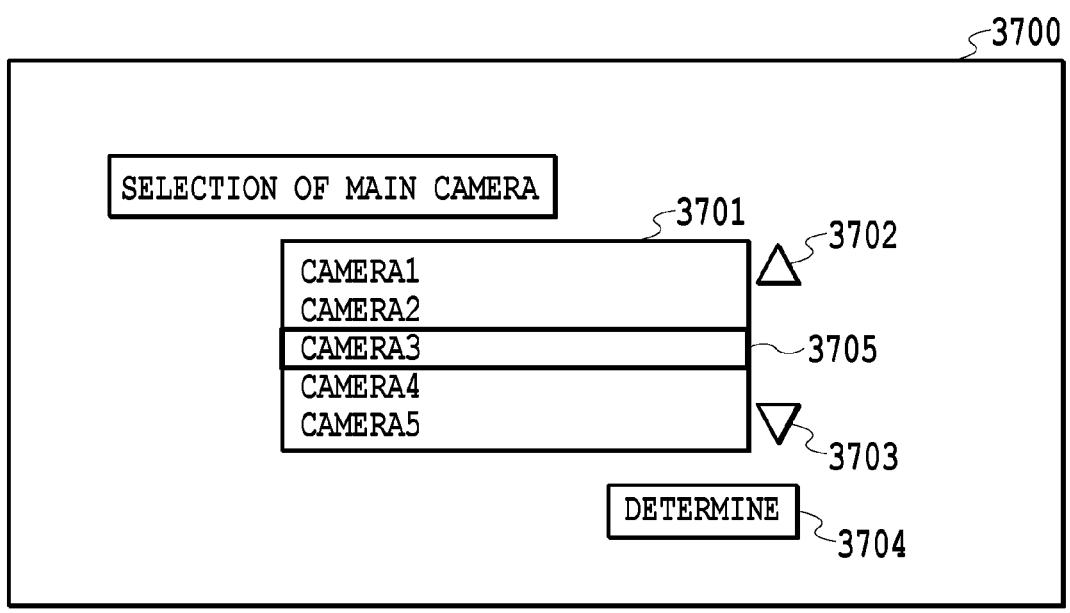
FIG. 37 is a UI displayed on a display of the sub camera according to the ninth embodiment.

First, at step S3601, on the display 110 on the sub camera side, a UI on which to select a main camera model is displayed. An example of the UI is shown in FIG. 37. In FIG. 37, reference numeral 3700 denotes the entire diagram of the UI, 3701 denotes a model name display part where the models of a plurality of main cameras are displayed, 3702 and 3703 denote selection parts to select the camera model name, 3704 denotes a Determine button to determine the model, and 3705 denotes a selected model display part where the currently selected model is displayed in a highlighted state. A user adjusts the selection parts 3702 and 3703 while watching the model name display part 3701 and presses down the Determine button 3704 finally. The cameral model names displayed in the part 3701 may be contents stored in advance in the RAM or ROM within the control unit 107 within the sub camera or the result of acquiring the models of the main cameras existing in the vicinity by wireless communication may be displayed.

Next, at step S3602, whether a main camera has been selected by the user is determined. In the case where a main camera has been selected, the processing proceeds to step S3603. In the case where no main camera has been selected yet, the processing returns to step S3601.

Next, at step S3603, a UI on which to select a method for setting an image capturing condition is displayed on the display 110.

Figure 38:
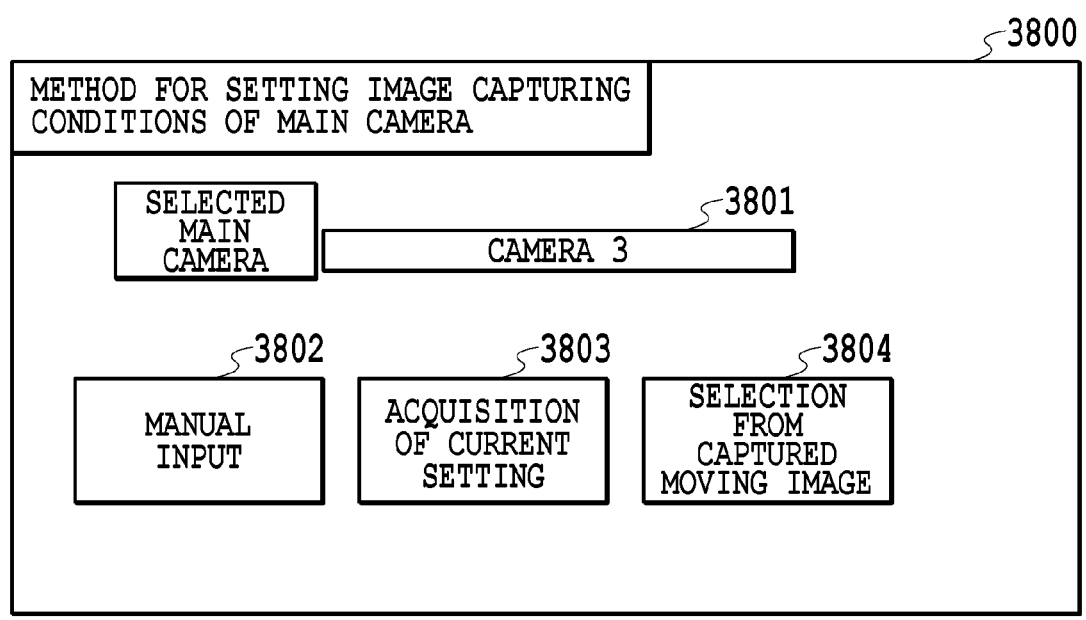
FIG. 38 is a UI displayed on the display of the sub camera according to the ninth embodiment.

An example of the UI is shown in FIG. 38. In FIG. 38, reference numeral 3800 denotes the entire diagram of the UI, reference numeral 3801 denotes a display part where a camera model name selected by a user at step S3601 is displayed, and reference numerals 3802 to 3804 denote parts to select a kind of method for setting an image capturing condition: the part 3802 is used to manually input an image capturing condition, the part 3803 is used to acquire a condition currently set in the main camera, and the part 3804 is used to select a captured moving image within the main camera to set an image capturing condition. Hereinafter, a method for setting each image capturing condition is explained.

<Manual Setting of an Image Capturing Condition of the Main Camera>

At step S3604, whether Manual input has been selected is determined. In the case where Manual input has been selected, the processing proceeds to step S3605. In the case where Manual input has not been selected, the processing proceeds to step S3609.

Figure 39:
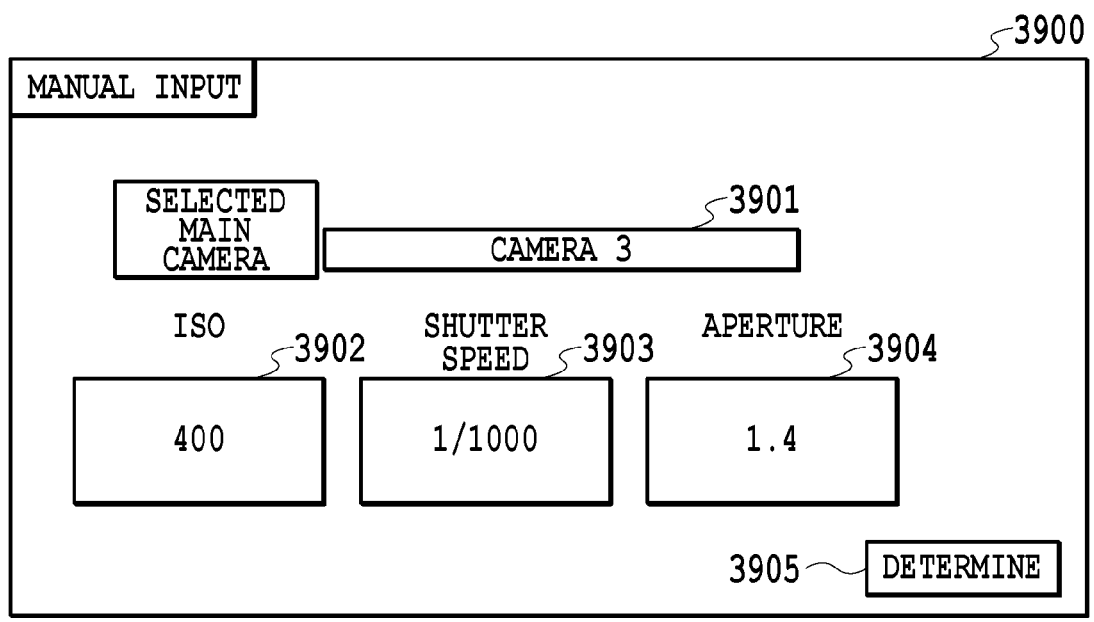
FIG. 39 is a UI displayed on the display of the sub camera according to the ninth embodiment.

Next, at step S3605, a UI of a user input screen on which a user inputs manually is displayed on the display 110. An example of the UI is shown in FIG. 39. In FIG. 39, reference numeral 3900 denotes the entire diagram of the UI, reference numeral 3901 denotes a display part where the camera model name selected by a user at step S3601 is displayed, reference numeral 3902 denotes an input part where the ISO speed is input, reference numeral 3903 denotes an input part where the shutter speed is input, reference numeral 3904 denotes an input part where the aperture is input, and reference numeral 3905 denotes a Determine button used to transmit an image capturing condition to the control unit 107.

Next, at step S3606, whether the Determine button 3905 in FIG. 39 has been pressed by a user is determined. In the case where the button has been pressed, the processing proceeds to step S3607. In the case where the button has not been pressed, the processing returns to step S3606 and the display of the user input screen is maintained.

Next, at step S3607, an image capturing condition of the sub camera corresponding to the image capturing condition of the main camera is determined. In the present embodiment, it is assumed that a noise reference table of the sub camera itself similar to that in the first embodiment and a noise reference table for each main camera as shown in FIG. 40 are stored in the RAM or ROM within the control unit 107 within the sub camera. Here, a method for determining an image capturing condition of the sub camera is explained. First, the control unit 107 reads the reference table corresponding to the model of the main camera selected by a user. Further, the control unit 107 reads the table whose photometric value is the same as that of current sub camera. Finally, the control unit 107 acquires the noise amount corresponding to the ISO speed, the shutter speed, and the aperture set by the user. Due to this, it is possible to grasp the noise amount in the case where the main camera photographs the scene in which the sub camera is currently placed. The image capturing condition of the sub camera under which the same noise amount as that of the main camera is obtained is determined by the same method as that in the first embodiment. Further, in the case where there is a plurality of image capturing conditions under which a desired noise amount is obtained, an image capturing condition closest to the image capturing condition of the main camera is selected. In this manner, it is made possible to bring the image quality other than the noise amount of the main camera to that of the sub camera.

Next, at step S3608, the control unit 107 sets an image capturing condition for the optical unit 101, the A/D conversion circuit 104, and the image processing circuit 105 of the sub camera so that the condition determined at step S3607 is implemented.

<Image Capturing Condition Setting of Main Camera by Communication Connection>

Next, a method for directly acquiring an image capturing condition from the main camera connected by communication is explained as a method for setting an image capturing condition of the main camera other than Manual input.

At step S3609, whether communication can be established between the sub camera and the main camera is determined. In the case where communication can be established, the processing proceeds to step S3610. In the case where communication is not established yet, the processing proceeds to step S3603 and the state where the UI of the method for setting an image capturing condition is displayed is maintained.

Next, at step S3610, whether the button 3803 to acquire the current image capturing condition of the main camera has been pressed by a user on the UI 3800 is determined. In the case where the button has been pressed, the processing proceeds to step S3611. In the case where the button has not been pressed, the processing proceeds to step S3612.

Next, at step S3611, the current image capturing condition of the main camera is acquired. The image capturing condition to be acquired includes at least one of the ISO speed, the f-stop, the shutter speed, the ND filter, and the lens model. It may also be possible to directly acquire the noise amount set on the main camera side other than the above-described image capturing condition.

Next, as in the case of Manual input, the processing proceeds to steps S3607 and S3608 and the image capturing condition of the sub camera is set. In the case where the noise amount has been acquired in advance in addition to the image capturing condition of the main camera, it is recommended to set the image capturing condition of the sub camera by selecting the reference table of the sub camera by which the same noise amount is obtained at step S3607. At this time, the image capturing condition on the sub camera side close to the image capturing condition of the main camera is selected.

<Image Capturing Condition Setting by Selecting Captured Moving Image of Main Camera>

Next, a method for setting an image capturing condition based on captured moving image data recorded within the main camera from the main camera connected by communication is explained.

At step S3612, whether the button 3804 to select an image capturing condition from a captured moving image has been pressed by a user on the UI 3800 is determined. In the case where the button has been pressed, the processing proceeds to step S3613. In the case where the button has not been pressed, the processing returns to step S3603.

Figure 41:
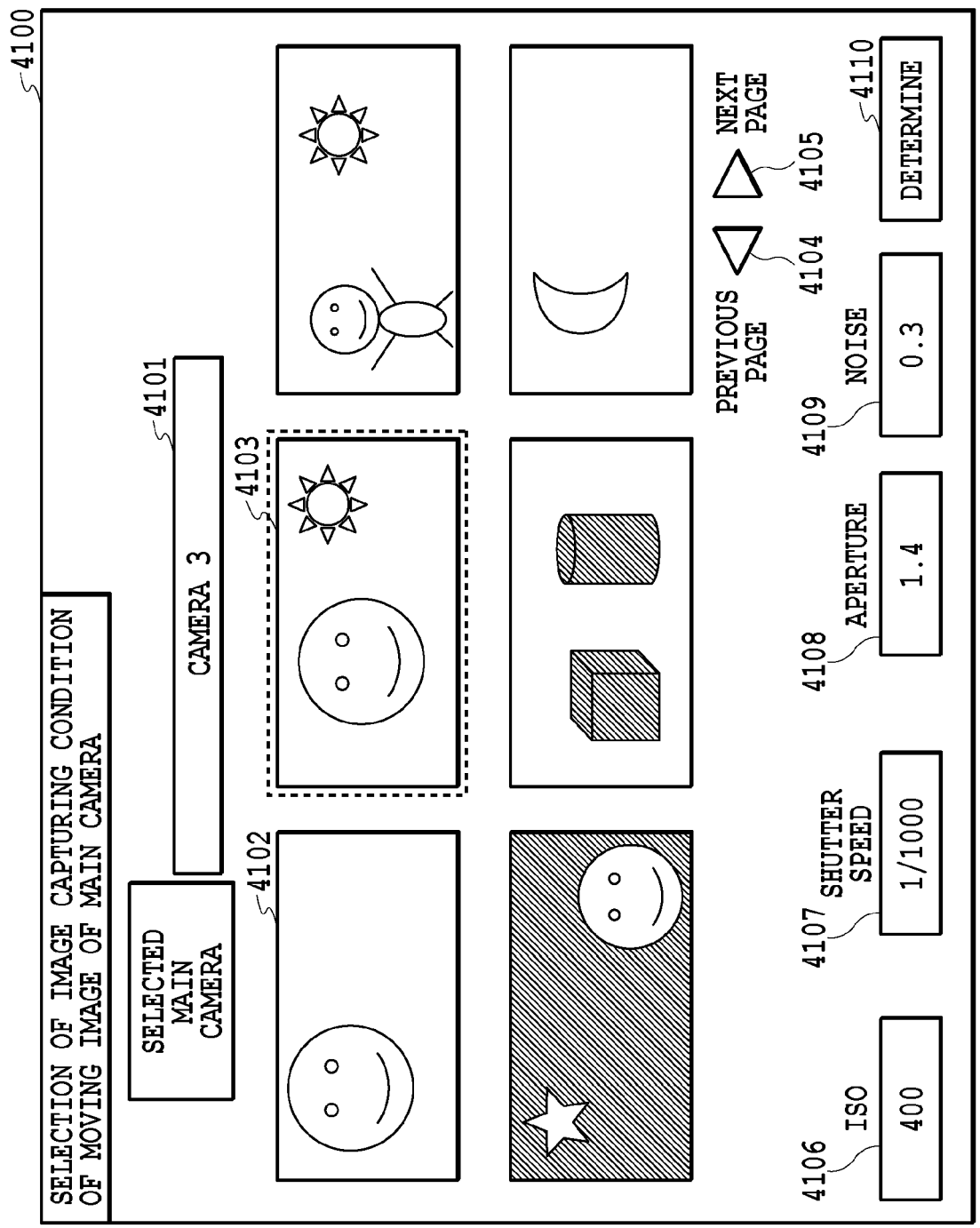
FIG. 41 is a UI displayed on the display of the sub camera according to the ninth embodiment.

Next, at step S3613, information of the captured moving image data recorded within the main camera is transmitted to the sub camera and is displayed on a UI on the display 110 of the sub camera as thumbnail images. An example of the UI is shown in FIG. 41. In FIG. 41, reference numeral 4100 denotes the entire diagram of the UI, reference numeral 4101 denotes a display part where a cameral model name selected by a user at step S3601 is displayed, reference numeral 4102 denotes a thumbnail image of the captured moving image recorded in the main camera, reference numeral 4103 denotes a selected part where a thumbnail image currently selected by a user is displayed in a highlighted state, reference numerals 4104 and 4105 denote selected image moving parts to select another thumbnail image, reference numerals 4106, 4107, and 4108 denote image capturing condition display parts where the ISO speed, the shutter speed, and the aperture are displayed, respectively, which are the image capturing condition of the moving image selected in the selected part 4103, reference numeral 4109 denotes a noise amount display part where the noise amount of the moving image selected in the selected part 4103 is displayed, and reference numeral 4110 denotes a Determine button used to transmit the image capturing condition of the selected moving image to the control unit 107.

Next, as in the case of Manual input, the processing proceeds to steps S3607 and S3608 and the image capturing condition of the sub camera are set. This time, it is recommended to set the image capturing condition of the sub camera by selecting the reference table of the sub camera by which the same noise amount as that of the main camera is obtained at step S3607. At this time, the image capturing condition on the sub camera side close to the image capturing condition of the main camera is selected.

As above, according to the present embodiment, it is made possible to easily determine the image capturing condition of the sub camera close to the noise amount of the main camera by setting the model and the image capturing condition of the main camera on the sub camera side. Further, it is made possible to select the image capturing condition of the sub camera close to the image capturing condition of the main camera by inputting information on the image capturing condition of the main camera to the sub camera, and therefore, it is made possible to bring the image quality other than noise between cameras.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-210924, filed on Oct. 8, 2013, and No. 2014-189187, filed on Sep. 17, 2014, which are hereby incorporated by reference herein in their entirety.

What is claimed is:

1. An image capturing system comprising:
a plurality of image capturing apparatuses; and
an information processing apparatus that controls the plurality of image capturing apparatuses, wherein
each of the plurality of image capturing apparatuses comprises:
  a memory storing a program; and
  a processor that executes the program to function as
    a target noise amount specifying unit that acquires a target noise amount as a noise amount that is targeted; and
    an image capturing parameter determination unit that determines image capturing conditions based on the target noise amount, where said image capturing conditions are specified by one or more image capturing parameters, and
the information processing apparatus comprises:
  a memory storing a program; and
  a processor that executes the program to function as
    a noise amount range determination unit that determines a range that can be taken by a noise amount in each image capturing apparatus;
    a common area calculation unit that calculates a common range of a noise amount common to the plurality of image capturing apparatuses; and
    a target noise amount determination unit that determines a target noise amount from the common range of the noise amount.

2. The image capturing system according to claim 1, wherein the processor of the information processing apparatus further functions as an image processing parameter determination unit that determines a parameter related to image processing that an image capturing apparatus having no common range is caused to perform in a case where there is no common range of the noise amount common to all image capturing apparatuses.

3. An information processing apparatus configured to control a plurality of image capturing apparatuses, the information processing apparatus comprising:
- a memory storing a program; and
- a processor that executes the program to function as
  - a noise amount range determination unit that determines a range that can be taken by a noise amount in each image capturing apparatus;
  - a common area calculation unit that calculates a common range of a noise amount common to the plurality of image capturing apparatuses; and
  - a target noise amount determination unit that determines a target noise amount from the common range of the noise amount.

4. An information processing method for controlling a plurality of image capturing apparatuses performed by an information processing apparatus, the method comprising:
- a noise amount range determination step of determining a range that can be taken by a noise amount in each image capturing apparatus;
- a common area calculation step of calculating a common range of a noise amount common to the plurality of image capturing apparatuses; and
- a target noise amount determination step of determining a target noise amount from the common range of the noise amount.

5. A non-transitory computer readable storage medium storing a program for causing a computer to perform an information processing method for controlling a plurality of image capturing apparatuses performed by an information processing apparatus, the method comprising:
- a noise amount range determination step of determining a range that can be taken by a noise amount in each image capturing apparatus;
- a common area calculation step of calculating a common range of a noise amount common to the plurality of image capturing apparatuses; and
- a target noise amount determination step of determining a target noise amount from the common range of the noise amount.

* * * * *